US008904756B2

(12) United States Patent
Yoda et al.

(10) Patent No.: US 8,904,756 B2
(45) Date of Patent: Dec. 9, 2014

(54) EXHAUST EMISSION CONTROL SYSTEM OF INTERNAL COMBUSTION ENGINE

(75) Inventors: Kimikazu Yoda, Susono (JP); Takaaki Itou, Mishima (JP); Keisuke Sano, Susono (JP); Kazuhiro Wakao, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 1029 days.

(21) Appl. No.: 12/990,680

(22) PCT Filed: Mar. 12, 2009

(86) PCT No.: PCT/IB2009/000499
§ 371 (c)(1),
(2), (4) Date: Nov. 2, 2010

(87) PCT Pub. No.: WO2009/136238
PCT Pub. Date: Nov. 12, 2009

(65) Prior Publication Data
US 2011/0047987 A1    Mar. 3, 2011

(30) Foreign Application Priority Data
May 9, 2008    (JP) .................................. 2008-123581

(51) Int. Cl.
*F01N 3/00*    (2006.01)
*F01N 3/08*    (2006.01)
*F01N 11/00*    (2006.01)

(52) U.S. Cl.
CPC ........... *F01N 3/0814* (2013.01); *F01N 2550/03* (2013.01); *F01N 3/0878* (2013.01); *F01N 2410/00* (2013.01); *Y02T 10/47* (2013.01); *F01N 11/002* (2013.01); *F01N 3/0885* (2013.01)
USPC .................... 60/277; 60/287; 60/297; 60/324

(58) Field of Classification Search
CPC .. F01N 3/0814; F01N 2/0885; F01N 2550/03
USPC ...................................... 60/272–324
See application file for complete search history.

(56) References Cited

U.S. PATENT DOCUMENTS 6,158,212 A    12/2000  Tanaka
6,263,667 B1 *  7/2001  Sawada et al. .................. 60/277

(Continued)

FOREIGN PATENT DOCUMENTS

DE    199 63 927          7/2001
EP    1 491 737 A1       12/2004

(Continued)

OTHER PUBLICATIONS

English Translation of JP2006342700 to Ito, Takaaki.*

(Continued)

*Primary Examiner* — Jesse Bogue
*Assistant Examiner* — Anthony Ayala Delgado
(74) *Attorney, Agent, or Firm* — Finnegan, Henderson, Farabow, Garrett & Dunner, LLP

(57) ABSTRACT

An exhaust emission control system of an internal combustion engine includes: a bypass passage (22) provided in an exhaust passage (14) of the engine and arranged to bypass a main passage (16) as a part of the exhaust passage, a NOx adsorbent (28) provided in the bypass passage and adapted to adsorb at least NOx as one of components contained in exhaust gas, a channel switching device (30) that switches a channel of the exhaust gas between the main passage and the bypass passage, an adsorption control device (50) that controls the channel switching device, based on operating conditions of the engine, so as to cause the exhaust gas to flow through the bypass passage, and an adsorbing capability determining device (50) that determines, when the adsorbing capability of the NOx adsorbent degrades, whether the degradation in the adsorbing capability is a surmountable degradation from which the NOx adsorbent can recover, or an insurmountable degradation from which the NOx adsorbent cannot recover.

15 Claims, 13 Drawing Sheets

(56) References Cited

U.S. PATENT DOCUMENTS

| | | | |
|---|---|---|---|
| 6,651,423 B1 * | 11/2003 | Blumenstock et al. | 60/277 |
| 2001/0011455 A1 * | 8/2001 | Harima et al. | 60/288 |
| 2003/0046924 A1 * | 3/2003 | Iihoshi et al. | 60/277 |
| 2003/0049176 A1 | 3/2003 | Sato et al. | |
| 2004/0250532 A1 * | 12/2004 | Miura et al. | 60/277 |
| 2010/0031634 A1 * | 2/2010 | Iida et al. | 60/277 |
| 2010/0307141 A1 * | 12/2010 | Wakao et al. | 60/288 |

FOREIGN PATENT DOCUMENTS

| | | |
|---|---|---|
| GB | 2 418 376 A | 3/2006 |
| JP | 2001-50037 | 2/2001 |
| JP | 2002-97938 | 4/2002 |
| JP | 2003-519322 | 6/2003 |
| JP | 2005-30284 | 2/2005 |
| JP | 2006-342700 | 12/2006 |
| WO | WO 01/49992 A1 | 7/2001 |

OTHER PUBLICATIONS

Notification of Reason(s) for Refusal in Japanese Patent Application No. 2008-123581, Drafting Date: Feb. 23, 2010.

Written Opinion of the International Searching Authority in International Application No. PCT/IB2009/000499, Mailing Date: Jun. 16, 2009.

International Search Report in International Application No. PCT/IB2009/000499, Mailing Date: Jun. 16, 2009.

Notification of the First Office Action for Chinese Appl. No. 200980100724.0 dated Jul. 23, 2012.

* cited by examiner

EXHAUST EMISSION CONTROL SYSTEM OF INTERNAL COMBUSTION ENGINE

CROSS-REFERENCE TO RELATED APPLICATIONS

This application is a national phase application of International Application No. PCT/IB2009/000499, filed Mar. 12, 2009, and claims the priority of Japanese Application No. 2008-123581, filed May 9, 2008, the contents of both of which are incorporated herein by reference.

BACKGROUND OF THE INVENTION

1. Field of the Invention

The invention relates to an exhaust emission control system favorably used in an internal combustion engine, and in particular to an exhaust emission control system of an internal combustion engine in which a NOx adsorbent is disposed in a bypass passage provided in an exhaust system of the engine.

2. Description of the Related Art

An exhaust emission control system of an internal combustion engine in which a bypass passage is provided in an exhaust system and a NOx adsorbent is disposed in the bypass passage is known, as disclosed in, for example, Japanese Patent Application Publication No. 2006-342700 (JP-A-2006-342700).

Upon cold start of the engine, for example, the above type of exhaust emission control system causes exhaust gas to flow through the bypass passage. Thus, when the engine is started while a catalyst has not been warmed up, the system allows the NOx adsorbent to adsorb a NOx component contained in the exhaust gas, thereby to improve the quality of exhaust emissions during starting of the engine.

In the exhaust emission control system as described above, the NOx component in the exhaust gas is adsorbed by the NOx adsorbent. However, the NOx adsorbing capability of the NOx adsorbent may drop off or degrade depending on, for example, an environment in which the adsorbent is used. The degradation in the adsorbing capability may be a surmountable degradation which is caused by reversible changes in the structure of the adsorbent and from which the adsorbent can recover, or an insurmountable degradation (permanent deterioration) which is caused by irreversible structural changes in the adsorbent and from which the adsorbent cannot recover.

In the exhaust emission control system as described above, the above two types of degradation in the adsorbing capability are not discriminated from each other. In the above-described emission control system, therefore, wasteful regeneration control, or the like, may be performed so as to resume the adsorbing capability, even in the case where permanent deterioration occurs in the NOx adsorbent. In this case, the NOx adsorbent continues to be used without being recovered from the degradation of the adsorbing capability, resulting in deterioration of exhaust emissions during starting of the engine. In addition, if fuel injection and other engine operations are performed under useless regeneration control, the exhaust emissions may be further deteriorated.

SUMMARY OF THE INVENTION

The invention provides an exhaust emission control system of an internal combustion engine, which takes an appropriate measure in accordance with the type of performance degradation when the performance (e.g., adsorbing capability) of a NOx adsorbent degrades.

A first aspect of the invention relates to an exhaust emission control system of an internal combustion engine. The exhaust emission control system includes: a bypass passage provided in an exhaust passage of the internal combustion engine and arranged to bypass a main passage that is a part of the exhaust passage, a NOx adsorbent provided in the bypass passage and adapted to adsorb at least NOx from among components contained in exhaust gas, a channel switching device that switches a channel of the exhaust gas between the main passage and the bypass passage, an adsorption control device that controls the channel switching device, based on operating conditions of the internal combustion engine, so as to cause the exhaust gas to flow through the bypass passage, and an adsorbing capability determining device that determines, when the adsorbing capability of the NOx adsorbent degrades, whether the degradation in the adsorbing capability is a surmountable degradation from which the NOx adsorbent can recover, or an insurmountable degradation from which the NOx adsorbent cannot recover.

With the above arrangement, when the adsorbing capability of the NOx adsorbent degrades, the adsorbing capability determining device is able to determine whether the degradation in the adsorbing capability is a surmountable deterioration from which the NOx adsorbent can recover, or an insurmountable deterioration from which the NOx adsorbent cannot recover. Thus, the system can promptly take an appropriate measure, such as reduction control or a warning operation, depending on the type of the deterioration. Namely, the reduction control is prevented from being performed even in the case of insurmountable deterioration, or a wasteful operation, such as turn-on of a warning light, is prevented from being performed even in the case of surmountable deterioration. Accordingly, the adsorbing capability of the NOx adsorbent can be held at a sufficiently high level.

In the system according to the above aspect of the invention, the adsorbing capability determining device includes an oxidation determining unit that determines whether the degradation in the adsorbing capability is caused by oxidation of the NOx adsorbent, and a permanent deterioration determining unit that determines, when the degradation in the adsorbing capability is not caused by oxidation, whether the degradation in the adsorbing capability is caused by irreversible structural changes in the NOx adsorbent.

With the above arrangement, when the oxidation determining unit determines that the degradation in the adsorbing capability of the NOx adsorbent is not caused by surmountable deterioration due to oxidation, the permanent deterioration determining unit determines whether insurmountable permanent deterioration occurs in the NOx adsorbent. In this manner, the influence of oxidation deterioration can be excluded in advance before a determination as to the occurrence of permanent deterioration is made. Namely, since a determination on permanent deterioration can be made without taking account of the degradation in the adsorbing capability due to oxidation deterioration, an erroneous determination is prevented from being made because of the existence of oxidation deterioration along with permanent deterioration, and the presence or absence of only the permanent deterioration can be determined with high accuracy.

The exhaust emission control system as described above may further include a first temperature detecting device that detects a temperature of a portion of the NOx adsorbent which is located on the upstream side as viewed in a direction in which the exhaust gas flows, as an upstream-side temperature, and a second temperature detecting device that detects a temperature of a portion of the NOx adsorbent which is located on the downstream side as viewed in the direction in which the exhaust gas flows, as a downstream-side temperature. In this system, the adsorbing capability determining device may compare changes in the upstream-side temperature with changes in the downstream-side temperature when the exhaust gas flows into the NOx adsorbent to cause the changes in the upstream-side temperature and the downstream-side temperature, and may determine whether the degradation in the adsorbing capability is an insurmountable degradation from which the NOx adsorbent cannot recover, based on a result of the comparison.

In the system as described above, when exhaust gas flows into the NOx adsorbent, water contained in the exhaust gas is initially adsorbed by an upstream portion (front portion) of the NOx adsorbent, resulting in an increase in the temperature of the front portion. Then, if the front portion of the NOx adsorbent is brought into a saturated condition, i.e., is saturated with water adsorbed thereon, water reaches a downstream portion (rear portion) of the NOx adsorbent, resulting in an increase in the temperature of the rear portion.

Accordingly, the water adsorbing capability of the NOx adsorbent can be gasped or estimated by comparing the rate of change of the upstream-side temperature with that of the downstream-side temperature, and detecting the timing of temperature rises, such as a time lag between rises in the upstream-side temperature and the downstream-side temperature. Then, the degree of insurmountable deterioration that occurs in the NOx adsorbent can be accurately determined, using the relationship between the water adsorbing capability and the level of the insurmountable deterioration which are in correlation with each other.

The exhaust emission control system as described above may further include a temperature increase rate acquiring device that obtains a rate of increase of temperature per unit time, with regard to at least one of the upstream-side temperature and the downstream-side temperature which increase as the exhaust gas flows through the NOx adsorbent, and a time lag acquiring device that obtains a time lag between a rise in the upstream-side temperature and a rise in the downstream-side temperature. In this system, the adsorbing capability determining device may determine whether the degradation in the adsorbing capability is an insurmountable degradation from which the NOx cannot recover, based on a product of the rate of increase of temperature and the time lag.

In the system as described above, when the flow rate of the exhaust gas increases, the amount of heat generated per unit time when the NOx adsorbent adsorbs water in the exhaust gas increases, and the rate of increase of temperature increases accordingly. On the other hand, when the flow rate of the exhaust gas increases, a time lag between a temperature rise in the front portion of the NOx adsorbent and a temperature rise in the rear portion is reduced by an amount corresponding to an increase in the amount of water supplied to the adsorbent per unit time.

Therefore, the product of the rate of increase of temperature and the time lag may be used for cancelling out changes in the flow rate of the exhaust gas. Accordingly, if a determination on the adsorbing capability of the NOx adsorbent is made based on the product, variations in the product, or variations in the result of the determination, with changes in the flow rate of the exhaust gas can be reduced or eliminated. Consequently, errors are prevented from arising in the result of the determination depending on the operating conditions of the engine even where the deterioration level of the NOx adsorbent is constant, thus assuring improved accuracy in the determination.

The exhaust emission control system as described above may further include a temperature increase rate acquiring device that obtains a rate of increase of temperature per unit time, with regard to the upstream-side temperature and the downstream-side temperature which increase as the exhaust gas flows through the NOx adsorbent, and a time lag acquiring device that obtains a time lag between a rise in the upstream-side temperature and a rise in the downstream-side temperature. In this system, the adsorbing capability determining device may determine whether the degradation in the adsorbing capability is an insurmountable degradation from which the NOx adsorbent cannot recover, based on a product of an average of the rate of increase of the upstream-side temperature and the rate of increase of the downstream-side temperature and the time lag.

With the arrangement as described above, it is determined whether the degradation in the adsorbing capability is an insurmountable degradation from which the NOx adsorbent cannot recover, based on the product of the average of the rate of increase of the upstream-side temperature and the rate of increase of the downstream-side temperature and the time lag. Thus, influences of detection errors in the individual temperatures on the determination can be reduced, and the parameter for use in the determination can be accurately calculated.

In the exhaust emission control system as described above, the adsorbing capability determining device may determine whether the degradation in the adsorbing capability is an insurmountable degradation from which the NOx adsorbent cannot recover, after purge control for purging NOx adsorbed on the NOx adsorbent is completed.

In the system as described above, the adsorption capability determining device makes a determination on deterioration after the purge control is completed. Thus, the process of determining deterioration can be always started from the time when the NOx adsorbent is in substantially the same dried condition. Consequently, variations in the result of the determination due to differences in the initial conditions can be reduced, and the determination can be made with stability.

The exhaust emission control system may further include a temperature condition determining device that determines whether a particular temperature condition appears in the NOx adsorbent, after the exhaust gas begins to flow into the NOx adsorbent, and a total heat amount calculating device that calculates a total amount of heat added to the NOx adsorbent during a period from a point in time at which the exhaust gas begins to flow into the NOx adsorbent to a point in time at which the particular temperature condition appears in the NOx adsorbent. In this system, the adsorbing capability determining device may determine whether the degradation in the adsorbing capability is an insurmountable degradation from which the NOx adsorbent cannot recover, based on the total amount of heat.

The total amount of heat added to the NOx adsorbent from the time when the exhaust gas begins to flow into the NOx adsorbent to the time when the NOx adsorbent is brought into a particular temperature condition is in correlation with the level of insurmountable deterioration. Accordingly, it can be determined whether insurmountable deterioration occurs in the NOx adsorbent, based on the total amount of heat.

In the exhaust emission control system as described just above, the temperature condition determining device may determine that the particular temperature condition appears in the NOx adsorbent when the NOx adsorbent reaches a predetermined reference temperature.

The temperature of the NOx adsorbent increases at a low rate until desorption of water adsorbed on the adsorbent is completed, and then increases largely or at a high rate after the desorption is completed. Accordingly, if the temperature level which the temperature of the NOx adsorbent reaches when it increases largely is set as the reference temperature, the time at which the desorption of the adsorbed water is completed can be precisely determined. Furthermore, the determination on the temperature condition can be easily made by merely comparing the temperature of the NOx adsorbent with the reference temperature.

In the exhaust emission control system as described above, the temperature condition determining device may determine that the particular temperature condition appears in the NOx adsorbent when a point of inflection arises in the rate of increase of the temperature of the NOx adsorbent per unit time.

The temperature of the NOx adsorbent starts increasing at a high rate when desorption of adsorbed water is completed, and a point of inflection appears in the rate of increase of the temperature at the time of completion of the desorption. Accordingly, the time at which the desorption of the adsorbed water is completed can be precisely determined by detecting the point of inflection in the rate of increase of the temperature. Furthermore, this determination method makes it possible to stably detect a subtle change in the rate of increase (or slope) of the temperature even where there are disturbances, such as a change in the ambient temperature.

The exhaust emission control system as described above may further include an exhaust gas flow rate acquiring device that obtains a flow rate of exhaust gas emitted from the internal combustion engine, a first gas temperature detecting device that detects a temperature of exhaust gas flowing into the NOx adsorbent, as an inflow gas temperature, a second gas temperature detecting device that detects a temperature of exhaust gas flowing out of the NOx adsorbent, as an outflow gas temperature, and a time measuring device that measures an elapsed time from the point in time at which the exhaust gas begins to flow into the NOx adsorbent to the point in time at which the particular temperature condition appears in the NOx adsorbent. In this system, the total heat amount calculating device may calculate the total amount of heat, based on the obtained flow rate of the exhaust gas, the detected inflow gas temperature, the detected outflow gas temperature, and the measured elapsed time.

With the above arrangement, a difference between the temperature of the exhaust gas flowing into the NOx adsorbent and that of the exhaust gas flowing out of the NOx adsorbent can be detected. Accordingly, the amount of heat added to the NOx adsorbent per unit time can be calculated using the difference in temperature and the flow rate of the exhaust gas. Then, the total amount of heat is calculated by integrating the amount of heat added per unit time, over a period of time from the time when the exhaust gas begins to flow into the NOx adsorbent to the time when desorption of water is completed.

In the exhaust emission control system as described above, the adsorbing capability determining device may determine whether the degradation in the adsorbing capability is an insurmountable degradation from which the NOx adsorbent cannot recover, when purge control for purging NOx adsorbed on the NOx adsorbent is started.

In the system as described above, the adsorbing capability determining device makes a determination on deterioration when purge control is started. Thus, the process of determining deterioration can always be started from the time when the NOx adsorbent is in substantially the same water adsorbing condition. Consequently, variations in the result of determination due to differences in the initial conditions can be reduced, and the determination can be made with stability.

The exhaust emission control system as described above may further include an auxiliary adsorbent provided, along with the NOx adsorbent, in the bypass passage and adapted to adsorb an exhaust gas component other than NOx, and an auxiliary deterioration determining device that determines whether the auxiliary adsorbent suffers an insurmountable degradation in the adsorbing capability, from which the auxiliary adsorbent cannot recover. In this system, the adsorbing capability determining device may correct a result of determination on deterioration of the NOx adsorbent, based on a result of determination on deterioration of the auxiliary adsorbent.

With the above arrangement, a final determination on deterioration of the NOx adsorbent can be made using, for example, a difference between the deterioration level of the NOx adsorbent and the deterioration level of the auxiliary adsorbent, or the ratio of the deterioration levels of these adsorbents. Thus, the result of determination regarding the NOx adsorbent can be corrected based on the result of determination regarding the auxiliary adsorbent.

Accordingly, even in the presence of errors in the result of determination due to disturbances, or the like, or inherent errors arising from the environment in which the NOx adsorbent is installed, these errors can be cancelled out between the result of determination regarding the NOx adsorbent and the result of determination regarding the auxiliary adsorbent. Accordingly, the accuracy in determination of deterioration is enhanced, and the reliability of the determination is improved.

The exhaust emission control system as described above may further include an exhaust air-fuel ratio acquiring device that obtains an air-fuel ratio of exhaust gas emitted from the internal combustion engine, and a normal-time reducing device that controls the channel switching device so as to cause the exhaust gas to flow through the bypass passage, when a temperature of the NOx adsorbent is within a temperature range suitable for a reduction process, and the detected air-fuel ratio of the exhaust gas becomes rich.

There is a limit to execution of the reduction process for the purpose of regenerating the NOx adsorbent during operation of the engine, in view of the performance of the engine, exhaust emissions, and other factors. In the system as described above, when the air-fuel ratio of the exhaust gas temporarily turns rich during normal combustion control (for example, during acceleration, deceleration, or the like), the normal-time reducing device can perform a reduction process on the NOx adsorbent by utilizing the fuel-rich condition. It is thus possible to increase the chance of the reduction process while hardly affecting the performance of the engine and exhaust emissions, and thus improve the efficiency of the reduction process.

The exhaust emission control system as described above may further include an adsorbent regenerating device that performs a reduction process on the NOx adsorbent when a surmountable degradation in the adsorbing capability, from which the NOx adsorbent can recover, occurs in the NOx adsorbent, and an informing device that gives a notice that an insurmountable degradation in the adsorbing capability, from which the NOx adsorbent cannot recover, occurs in the NOx adsorbent, when the insurmountable degradation in the adsorbing capability occurs in the NOx adsorbent.

With the above arrangement, when insurmountable deterioration occurs in the NOx adsorbent, the informing device can inform the user of the vehicle, or the like, of the occurrence of the deterioration, thus enabling the user, or the like, to promptly replace the NOx adsorbent with a new one. Also, if only surmountable deterioration from which the NOx adsorbent can recover occurs in the NOx adsorbent, the NOx adsorbent can be recovered from the deterioration by means of the adsorbent regenerating device. Thus, an appropriate measure can be taken depending on the type of the deterioration.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
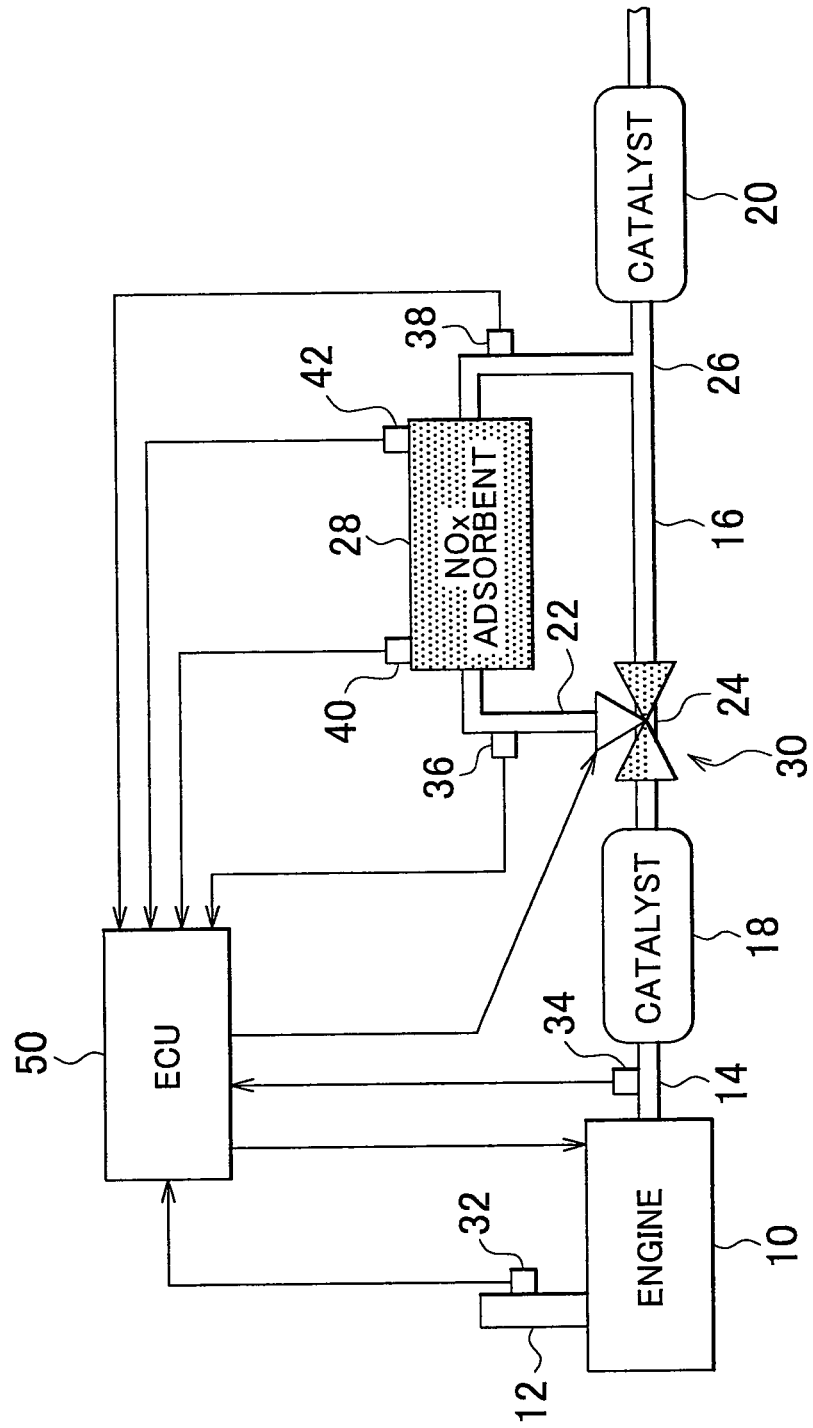
FIG. 1 is a view showing the whole construction of an exhaust emission control system according to a first embodiment of the invention.

Referring to FIG. 1 through FIG. 6, a first embodiment of the invention will be described in detail. FIG. 1 illustrates the whole construction of an exhaust emission control system according to the first embodiment. An internal combustion engine 10 shown in FIG. 1 is provided with an intake passage 12 through which intake air is drawn into cylinders, and an exhaust passage 14 through which exhaust gas emitted from the cylinders flows.

The exhaust passage 14 includes, as a part thereof, a main passage 16 arranged in parallel with a bypass passage 22 (which will be described later). In the exhaust passage 14, an upstream-side catalyst 18 is disposed upstream of the main passage 16 as viewed in the direction in which the exhaust gas flows, and a downstream-side catalyst 20 is disposed downstream of the main passage 16. The catalysts 18, 20, when they are in activated conditions after being warmed up, convert pollutants, such as NOx, HC and CO, contained in the exhaust gas, into harmless components, so as to clean the exhaust gas.

The bypass passage 22 is connected to the exhaust passage 14 in parallel with the main passage 16 so as to bypass the main passage 16. Namely, the bypass passage 22 diverges from the exhaust passage 14 at an upstream-side connection point 24 located at the upstream end of the main passage 16, and meets or joins the exhaust passage 14 again at a downstream-side connection point 26 located at the downstream end of the main passage 16.

A NOx adsorbent 28 that adsorbs at least NOx, out of the components contained in the exhaust gas, is provided in the bypass passage 22. The NOx adsorbent 28 is formed of a material, such as zeolite containing alumina, which has been ion exchanged with a metal, such as iron. The NOx adsorbent 28 is adapted to adsorb a pollutant, such as NOx, in the exhaust gas at low temperatures, and release the pollutant at high temperatures.

A switching valve 30 in the form of, for example, an electromagnetic cross valve or three way valve, which serves as a channel switching means, is provided between the main passage 16 and the bypass passage 22. The switching valve 30 is controlled by an ECU 50 (which will be described later), and is operable to switch the channel of the exhaust gas between the main passage 16 and the bypass passage 22. While the switching valve 30 is placed at the upstream-side connection point 24 in this embodiment, the invention is not limited to this arrangement, but the switching valve 30 may be placed at the downstream-side connection point 26.

Next, a sensor system of this embodiment will be explained. The sensor system includes an air flow meter 32 that detects the intake air quantity Ga of the engine, an A/F sensor 34 as an exhaust air-fuel ratio acquiring means for detecting the air-fuel ratio of exhaust gas (which will be called "exhaust air-fuel ratio") at a location upstream of the upstream-side catalyst 18, NOx sensors 36, 38 and temperature sensors 40, 42.

The NOx sensors 36, 38 are provided in the bypass passage 22 for detecting the amount (concentration) of NOx contained in the exhaust gas. In this embodiment, the upstream-side NOx sensor 36 is disposed in the bypass passage 22 upstream of the NOx adsorbent 28, and the downstream-side NOx sensor 38 is disposed in the bypass passage 22 downstream of the NOx adsorbent 28.

The temperature sensors 40, 42 serve as first and second temperature detecting means for detecting the temperature (bed temperature) of the NOx adsorbent 28. In this embodiment, the upstream-side temperature sensor 40 detects an upstream-side temperature T1, which is a temperature of a portion (hereinafter called "front portion") of the NOx adsorbent 28 located at the upstream side thereof as viewed in the direction of flow of exhaust gas. The downstream-side temperature sensor 42 detects a downstream-side temperature T2, which is a temperature of a portion (hereinafter called "rear portion") of the NOx adsorbent 28 located at the downstream side thereof.

The exhaust emission control system of this embodiment includes an ECU (Electronic Control Unit) 50 for controlling operating conditions of the engine 10. The ECU 50 consists of a microcomputer including storage devices, such as ROM and RAM. The sensor system as described above is connected to the input side of the ECU 50. The sensor system further includes a crank angle sensor for detecting the crank angle of the engine or the engine speed, a water temperature sensor for detecting the coolant temperature of the engine, an accelerator pedal position sensor for detecting the accelerator pedal travel, i.e., the amount of depression of the accelerator pedal.

The switching valve 30 as described above, and various actuators including, for example, a motor-driven throttle device for increasing or reducing the intake air quantity, fuel injection valves and ignition plugs are connected to the output side of the ECU 50. The ECU 50 drives the respective actuators so as to control the operation of the engine 10 while detecting the operating conditions of the engine 10 by means of the sensor system.

More specifically, the ECU 50 controls the opening of the throttle device in accordance with the amount of depression of the accelerator pedal by the driver, etc., and controls the amount of fuel injected from the fuel injection valves in accordance with the intake air quantity detected by the air flow meter 32. Then, the ECU 50 causes the ignition plugs to make a spark at appropriate ignition times. The ECU 50 also serves as an adsorption control means of this embodiment, and performs adsorption control and purge control in accordance with the operating conditions of the engine.

The adsorption control is performed under low-temperature conditions, for example, during cold starting of the engine, when the catalysts 18, 20 have not been activated. Under the adsorption control, the switching valve 30 switches the channel of the exhaust gas to the bypass passage 22. As a result, the exhaust gas emitted from the engine flows into the bypass passage 22 at a point (i.e., the upstream-side connection point 24) of the exhaust passage 14, and passes through the NOx adsorbent 28. During the passage through the NOx adsorbent 28, a NOx component in the exhaust gas is adsorbed by the NOx adsorbent 28, so that exhaust emissions are held in good conditions.

The adsorption control is finished, for example, when the engine has been warmed up, and the catalysts 18, 20 have been activated. At this time, the ECU 50 causes the switching valve 30 to switch the channel of the exhaust gas to the main passage 16. As a result, the exhaust gas is cleaned by the catalysts 18, 20 while flowing through the exhaust passage 14, and is then discharged to the outside.

On the other hand, the purge control is performed, for example, when a certain amount or more of NOx is adsorbed on the NOx adsorbent 28 while the catalysts 18, 20 are in activated conditions. Under the purge control, the switching valve 30 switches the channel of the exhaust gas to the bypass passage 22. As a result, high-temperature exhaust gas is supplied to the NOx adsorbent 28, and the NOx adsorbed on the adsorbent 28 is released from the adsorbent and flows into the exhaust passage 14, where the NOx and the exhaust gas are cleaned by the downstream-side catalyst 20. Consequently, the NOx adsorbent 28 is regenerated or brought back into a condition in which the adsorbent 28 is able to adsorb NOx.

As described above, the adsorbing capability of the NOx adsorbent 28 may be maintained through the purge control performed at appropriate times. In some cases, however, the adsorbing capability drops off or degrades depending on, for example, an environment in which the NOx adsorbent 28 is used. The degradation in the adsorbing capability may be surmountable performance degradation (which will be called "oxidation deterioration") that occurs due to reversible structural changes of the NOx adsorbent 28, or may be insurmountable performance degradation (which will be called "permanent deterioration") that occurs due to irreversible structural changes of the NOx adsorbent 28.

Generally, the oxidation deterioration is presumed to be caused by, for example, oxidation of a part of NOx adsorption sites that constitute the NOx adsorbent 28, but details of this type of deterioration have not been clarified. It is, however, found that when the oxidation deterioration occurs, the NOx adsorbent 28 can resume the adsorbing capability by being subjected to a reduction process (regeneration process) using a reductant, such as CO and HC. The above-mentioned NOx adsorption site is a unit structure consisting of aluminum contained in zeolite that constitutes the NOx adsorbent 28, metal ions carried by the aluminum, and surrounding silicon.

On the other hand, the permanent deterioration is presumed to be caused by release and elimination of aluminum in zeolite from the NOx adsorption sites, for example, when the NOx adsorbent 28 is exposed to high temperatures and humidity. In this case, the NOx adsorption sites are broken or damaged, and therefore, the adsorbing capability will not be resumed. Thus, the process for resuming the adsorbing capability is meaningfully performed only on the NOx adsorbent 28 suffering the oxidation deterioration, but is meaninglessly performed on the NOx adsorbent 28 suffering the permanent deterioration.

In this embodiment, therefore, when the adsorbing capability of the NOx adsorbent 28 drops off or degrades, it is determined whether the degradation in the adsorbing capability is caused by oxidation deterioration, or caused by permanent deterioration, and an appropriate measure is taken according to the result of the determination. In the following, a method of determining the type of performance degradation, processes performed based on the result of the determination, and so forth, will be explained.

When it is determined that the performance (i.e., adsorbing capability) of the NOx adsorbent 28 has degraded, the ECU 50 initially determines whether oxidation deterioration (i.e., deterioration due to oxidation) occurs in the NOx adsorbent 28. To make a determination on oxidation, the above-described purge control is performed in which the air-fuel ratio of the exhaust gas is kept in a rich condition. Namely, a reductant (e.g., fuel) is supplied to the NOx adsorbent 28, so that a provisional reduction process is carried out.

During the provisional reduction process, the ECU 50 adjusts, for example, the degree of richness of the air-fuel ratio of the exhaust gas, the duration for which the exhaust gas is held in a fuel-rich condition, and so forth, thereby to control the engine so that the amount of the reductant supplied to the NOx adsorbent 28 becomes equal to a preset or specified amount (a relatively small amount). Also, the ECU 50 adjusts the operating conditions of the engine, thereby to control the engine so that the temperature of the exhaust gas falls in a specified temperature range suitable for the reduction process.

When the adsorption control is performed after the above-described provisional reduction process is carried out, the ECU 50 detects a difference between the amount of NOx in the exhaust gas flowing into the NOx adsorbent 28 and the amount of NOx in the exhaust gas flowing out of the NOx adsorbent 28, by means of the NOx sensors 36, 38. In this manner, the amount of NOx adsorbed by the NOx adsorbent .28 can be calculated. Then, it can be determined, based on the amount of NOx adsorbed, whether the adsorbing capability has been resumed, namely, whether the degradation in the adsorbing capability is caused by oxidation deterioration.

If the adsorbing capability is not resumed even if the provisional reduction process is carried out, it is determined that the degradation of the adsorbing capability is not caused by the oxidation deterioration, and a determination as to the occurrence of permanent deterioration (which will be described later) is made. If the adsorbing capability is resumed through the provisional reduction process, on the other hand, at least oxidation deterioration occurs in the NOx adsorbent 28, and the ECU 50 performs full-scale reduction control.

In the reduction control, the ECU 50 supplies fuel serving as a reductant into the exhaust gas, and at the same time controls the switching valve 30 so that the exhaust gas is introduced into the bypass passage 22. As a result, high-temperature exhaust gas flows, along with the reductant, into the NOx adsorbent 28. The reductant causes the adsorption sites in zeolite of the NOx adsorbent 28 to be reduced from oxidized conditions, and the adsorbing capability, which has degraded due to oxidation deterioration, is resumed.

In this case, the air-fuel ratio of the air-fuel mixture is intentionally made rich, as an example of method of supplying the reductant to the exhaust gas. Also, injection control (so-called "post injection", "after injection", or the like) for supplying fuel into the exhaust gas may be performed, in which the fuel is injected at some point in time other than the intake stroke. As a further method of supplying the reductant, fuel may be injected from, for example, an exhaust injection valve installed in the exhaust passage 14.

In the reduction control as described above, the air-fuel ratio is changed for a purpose different from the combustion control of the engine. Therefore, there is a limit to execution of the reduction control during operation of the engine, in view of the performance of the engine, exhaust emissions, and other factors. In this embodiment, therefore, when the exhaust air-fuel ratio is made fuel-rich under normal combustion control, or control performed for a purpose different from the reduction process of the NOx adsorbent 28, passive reduction control (oxidation retardation control) is performed utilizing this condition (i.e., the exhaust air-fuel ratio being rich).

During normal combustion control, the exhaust air-fuel ratio may be temporarily made rich, for example, when the vehicle is accelerated or decelerated. If the temperature of the NOx adsorbent 28 is within a temperature range suitable for the reduction process when the rich condition is detected by the A/F sensor 34, the oxidation retardation control is performed under which the switching control 30 is controlled so that the exhaust gas is introduced into the bypass passage 22.

As a result, the NOx adsorbent 28 is reduced according to the same principle as that of the reduction control, and oxidation of the NOx adsorbent 28 can be retarded or prevented. Furthermore, the oxidation retardation control, which utilizes fuel-rich conditions developed during normal combustion control, has substantially no influence on the performance of the engine and exhaust emissions. Thus, the use of both the oxidation retardation control and the reduction control makes it possible to increase the chance of the reduction process, without forcing the air-fuel ratio to be rich, and thus enhance the efficiency of the reduction process.

As described above, when the degradation in the adsorbing capability of the NOx adsorbent 28 is caused by oxidation deterioration, the reduction control and the oxidation retardation control are performed so as to recover the NOx adsorbent 28 from the oxidation deterioration with reliability. Also, where it is determined, from the above-described determination on oxidation, that the degradation of the absorbing capability is not caused by oxidation deterioration, and where the adsorbing capability is not resumed even if the reduction control, or the like, is performed, a determination as to the occurrence of permanent deterioration is made as described below.

According to this embodiment, therefore, the influence of oxidation deterioration can be excluded in advance before a determination on permanent deterioration is made. Namely, since the degradation in the adsorbing capability due to oxidation deterioration need not be taken into consideration when a determination on permanent deterioration is made, an erroneous determination is prevented from being made due to the existence of oxidation deterioration along with permanent deterioration, and the occurrence of only the permanent deterioration can be determined with high accuracy.

The presence or absence of permanent deterioration is determined by detecting the upstream-side temperature T1 and downstream-side temperature T2 of the NOx adsorbent 28 by means of the temperature sensors 40, 42, and comparing changes in these temperatures. When a determination as to the occurrence of permanent deterioration is made, the switching valve 30 is initially controlled so that high-temperature exhaust gas is introduced into the bypass passage 22 while the NOx adsorbent 28 is in a condition where the above-described purge control is completed (namely, in a sufficiently dried condition).

When the exhaust gas flows into the NOx adsorbent 28, water contained in the exhaust gas is initially adsorbed by a front portion of the NOx adsorbent 28. As a result, the upstream-side temperature T1 measured in the front portion of the NOx adsorbent 28 increases due to adsorption heat generated during adsorption of water. Then, after a lapse of a certain time, the front portion of the NOx adsorbent 28 becomes saturated with water (namely, the amount of water adsorbed in the front portion reaches the maximum), and water that cannot be adsorbed by the front portion begins to be adsorbed by the rear portion of the NOx adsorbent 28. As a result, the downstream-side temperature T2 increases with a certain time lag after the upstream-side temperature T1 increases.

Figure 2:
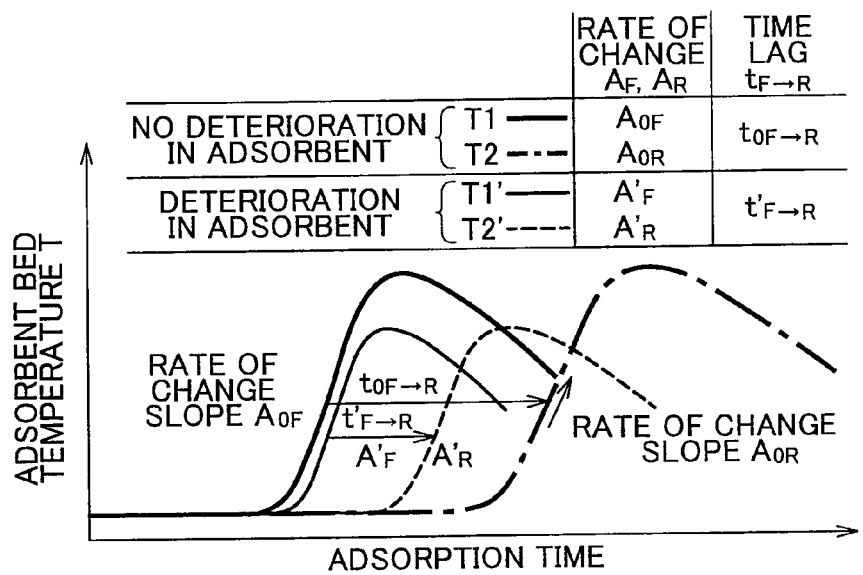
FIG. 2 is a graph showing the relationship between the behaviors of the upstream-side temperature and downstream-side temperature of a NOx adsorbent shown in FIG. 1, and the presence or absence of permanent deterioration.

FIG. 2 shows the relationship between the behaviors of the upstream-side temperature T1 and downstream-side temperature T2, and the presence or absence of permanent deterioration. In FIGS. 2, T1 and T2 represent the upstream-side temperature a downstream-side temperature, respectively, of the normal NOx adsorbent 28 that is free from permanent deterioration. Also, T1' and T2' represent the upstream-side temperature and downstream-side temperature, respectively, of the NOx adsorbent 28 that suffers permanent deterioration.

In FIG. 2, $A_F$ represents the rate of change of the upstream-side temperature T1, and $A_R$ represents the rate of change of the downstream-side temperature T2. The rate of change $A_F$, $A_R$ is defined as an amount of change (increase) in the temperature per unit time, and corresponds to the slope of the corresponding characteristic curve as shown in FIG. 2. In this case, $A_{0F}$ and $A_{0R}$ are the rates of change of the temperatures in the normal NOx adsorbent 28, and $A'_F$ and $A'_R$ are the rates of change of the temperatures in the NOx adsorbent 28 that suffers permanent deterioration. Also, the time lag $t_{F \to R}$ is defined as the time elapsed from a rise in the upstream-side temperature T1 to a rise in the downstream-side temperature T2. In this case, $t_{0F \to R}$ represents a time lag regarding the normal NOx adsorbent 28, and $t'_{F \to R}$ represents a time lag regarding the NOx adsorbent 28 that suffers permanent deterioration.

The water contained in the exhaust gas is adsorbed by the NOx adsorption sites of the NOx adsorbent 28. Therefore, as the number of normal NOx adsorption sites decreases due to permanent deterioration, the maximum amount of water that can be adsorbed by the NOx adsorbent 28 (i.e., the amount of water with which the NOx adsorbent 28 is saturated) also decreases accordingly. Namely, in the permanently deteriorated NOx adsorbent, adsorption of water at the rear portion side starts earlier as the amount of water with which the front portion is saturated decreases. Accordingly, the time lag $t'_{F \to R}$ regarding the permanently deteriorated NOx adsorbent is shorter than the time lag $t_{0F \to R}$ regarding the normal NOx adsorbent 28, as shown in FIG. 2. Namely, the time lag $t_{F \to R}$ tends to be shorter as permanent deterioration of the NOx adsorbent 28 progresses.

Also, if the amount of water with which the NOx adsorbent is saturated is reduced due to permanent deterioration, the maximum temperatures (i.e., the peak values of the temperatures T1, T2, T1', T2' shown in FIG. 2) reached when the respective portions of the NOx adsorbent are saturated with water are also lowered. However, the speed or rate of adsorption of water per unit time is hardly influenced by permanent deterioration if the NOx adsorbent is in an unsaturated condition. Therefore, no significant difference appears between the rates $A_{0F}$, $A_{0R}$ of change of the temperature in the normal NOx adsorbent 28 and the rates $A'_F$, $A'_R$ of change of the temperature in the permanently deteriorated adsorbent.

In view of the above-described points, the presence or absence of permanent deterioration is determined using, as a parameter, the product of the rate of change of the temperature and the time lag. More specifically, the rates $A_F$, $A_R$ of change of the temperatures at the front portion and the rear portion are respectively calculated, and the time lag $t_{F \to R}$ is calculated, based on changes in the detected values of the temperatures T1, T2. Then, the product of Average($A_F$, $A_R$) as the average of the rates $A_F$, $A_R$ of change and the time lag $t_{F \to R}$ is calculated as a parameter P for use in determination, according to the following equation (1).

$$P = \text{Average}(A_F, A_R) \cdot t_{F \to R} \quad (1)$$

Figure 3:
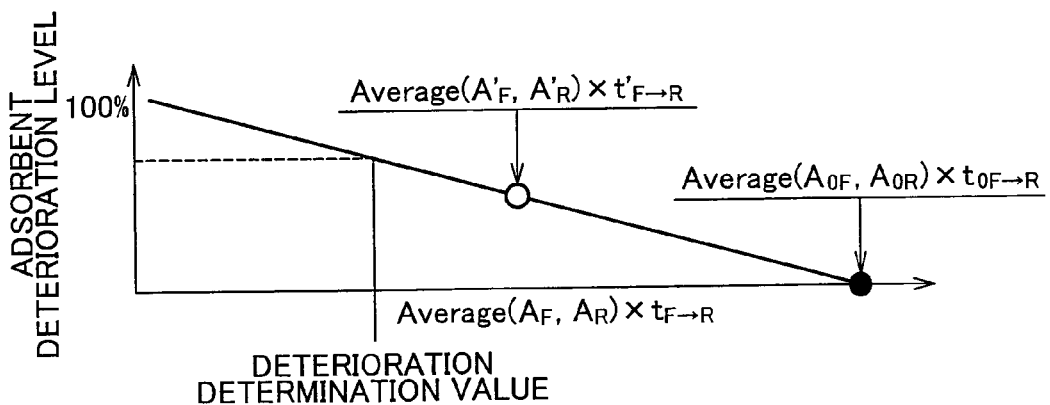
FIG. 3 is a graph showing the relationship between a parameter for use in determination of permanent deterioration and the level of permanent deterioration.

FIG. 3 shows the relationship between the parameter P and the level of permanent deterioration. As is understood from the above equation (1), Average($A_{0F}$, $A_{0R}$)·$t_{0F \to R}$ in FIG. 3 represents a parameter obtained with respect to the normal NOx adsorbent 28, and Average($A'_F$, $A'_R$)·$t'_{F \to R}$ represents a parameter obtained with respect to the permanently deteriorated adsorbent.

Since the time lag $t_{F \to R}$ becomes shorter as permanent deterioration progresses as described above, the parameter P decreases as the level of permanent deterioration increases, as shown in FIG. 3. Thus, when the parameter P is reduced to be smaller than a predetermined deterioration determination value, it is determined that permanent deterioration, whose level is so high that the NOx adsorbent 28 cannot be used, occurs in the NOx adsorbent 28. In this case, the deterioration determination value, which is a value of the parameter corresponding to the permissible limit of the deterioration level, is stored in advance in the ECU 50.

To calculate the above-described parameter P, the average Average($A_F$, $A_R$) of the rates of change, which is hardly influenced by permanent deterioration, is used in addition to the time lag $t_{F \to R}$ for the following reasons. While the water content of the exhaust gas is kept at a substantially constant value (about 12.5%), the amount of water supplied to the NOx adsorbent 28 per unit time increases as the flow rate of exhaust gas (≈the intake air quantity) increases. As a result, even if the permanent deterioration level is constant, the time it takes for the front portion of the NOx adsorbent 28 to be saturated with water (i.e., until the amount of water adsorbed by the front portion reaches the maximum), namely, the time lag $t_{F \to R}$, becomes shorter as the flow rate of the exhaust gas increases.

On the other hand, as the amount of water supplied to the NOx adsorbent 28 per unit time increases, the amount of heat liberated by the NOx adsorbent 28 increases accordingly. Thus, even if the permanent deterioration level is constant, the rates $A_F$, $A_R$ of change as the rates of increase of the temperatures, and the average Average($A_F$, $A_R$) thereof increase as the flow rate of the exhaust gas increases.

Accordingly, if the product of the average Average($A_F$, $A_R$) and the time lag $t_{F \to R}$ is used as the parameter P, changes in the flow rate of the exhaust gas depending on the operating conditions of the engine can be cancelled out between the average Average($A_F$, $A_R$) and the time lag $t_{F \to R}$. Namely, the parameter P can be kept substantially constant with respect to changes in the flow rate of the exhaust gas. It is thus possible to prevent the parameter P from varying depending on the operating conditions of the engine even though the permanent determination level of the NOx adsorbent 28 is constant, thus assuring improved determination accuracy.

The use of the average Average($A_F$, $A_R$) as the rate of change of the temperature leads to a reduction in an influence of detection errors in the rates $A_F$, $A_R$ of change, on the parameter P, and the parameter P can be calculated with improved accuracy. While the average Average($A_F$, $A_R$) is used for calculation of the parameter P in this embodiment, the parameter P may be obtained by multiplying one or both of the rates $A_F$, $A_R$ of change, by the time lag $t_{F \to R}$, instead of using the average. Furthermore, the method of calculating the parameter P according to the invention is not limited to the above-described method in which the product of the average Average($A_F$, $A_R$) and the time lag $t_{F \to R}$ is obtained. Namely, other calculation methods may be used provided that changes in the intake air quantity can be cancelled out between the rates $A_F$, $A_R$ of change and the time lag $t_{F \to R}$.

Figure 4:
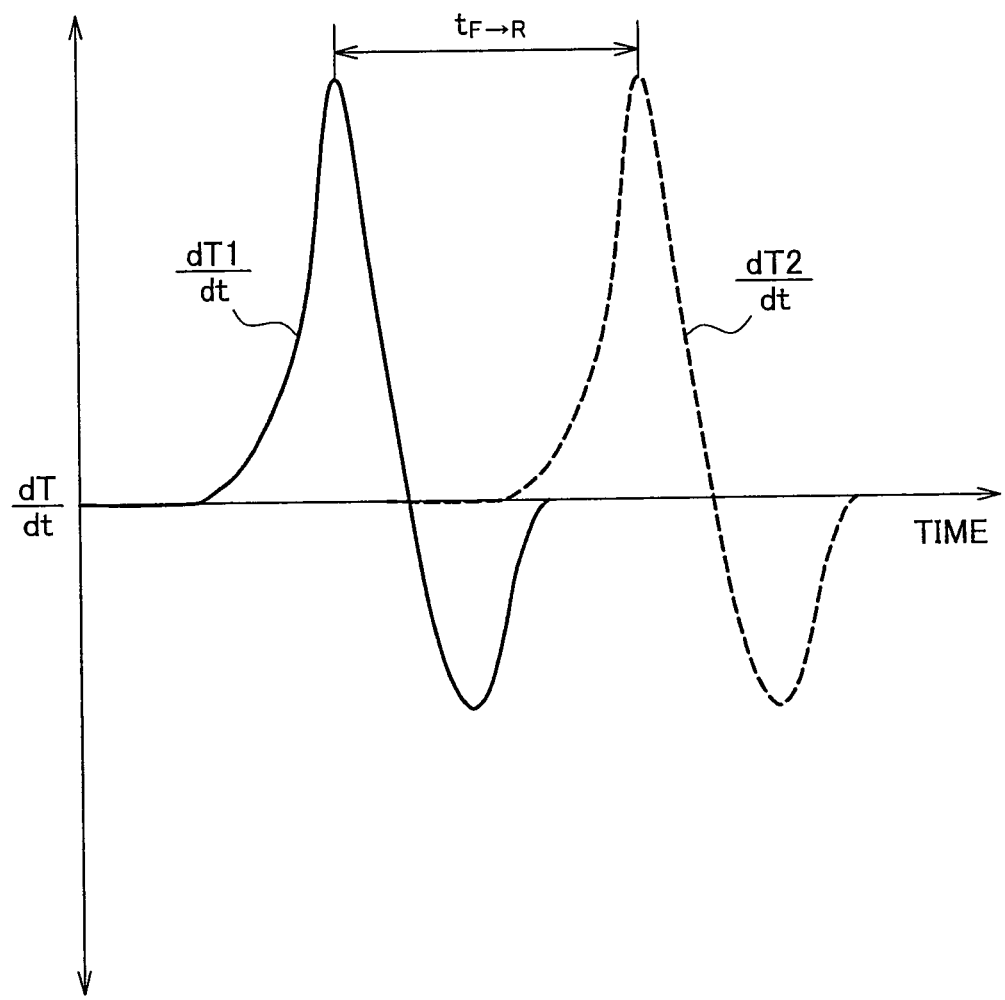
FIG. 4 is a graph showing a characteristic curve obtained by differentiating the upstream-side temperature and downstream-side temperature in FIG. 2, with respect to time.

In this embodiment, the time lag $t_{F \to R}$ is calculated using changes in the temperatures T1, T2 with time (time differential values). FIG. 4 shows characteristic curves obtained by differentiating the temperatures T1, T2 in FIG. 2, respectively, with respect to time. As shown in FIG. 4, a time difference between two points on the characteristic curves at which the time differential values of the temperatures T1, T2 are at the maximum is calculated as the time lag $t_{F \to R}$ for use in determination of permanent deterioration. In this manner, the time lag $t_{F \to R}$ between the temperatures T1, T2 that change along curves can be stably calculated in specific timing, thus assuring improved calculation accuracy.

If it is determined that permanent deterioration occurs in the NOx adsorbent 28, a warning lamp (MIL), or the like, of the vehicle may be turned on so as to inform the user of the vehicle, or the like, that the NOx adsorbent 28 has deteriorated permanently. With this arrangement, the user, or the like, can promptly replace the NOx adsorbent 28 with a new one. If only the oxidation deterioration occurs in the NOx adsorbent 28, the NOx adsorbent 28 can be regenerated through the reduction control and/or oxidation retardation control, as described above. Thus, an appropriate measure against deterioration can be taken depending on the type of the deterioration.

According to this embodiment of the invention, when the adsorbing capability of the NOx adsorbent 28 degrades, it can be accurately and easily determined whether the degradation in the adsorbing capability is caused by oxidation deterioration or permanent deterioration, as described above in detail. Thus, the reduction control, or an appropriate measure, such as a warning operation, can be promptly carried out, according to the type of the deterioration. Namely, the reduction control is prevented from being performed irrespective of the occurrence of permanent deterioration, while a wasteful operation, such as turn-on of the warning light, is prevented from being performed irrespective of the occurrence of oxidation deterioration. Accordingly, the adsorbing capability of the NOx adsorbent 28 can be constantly held at a sufficiently high level.

Also, in this embodiment, the presence or absence of permanent deterioration is determined by comparing the upstream-side temperature T1 with the downstream-side temperature T2. More specifically, the water adsorbing ability of the NOx adsorbent 28 can be acquired by comparing, for example, the rates of change of the temperatures T1, T2, the timing of temperature rises, and so forth, with regard to the front portion and rear portion of the NOx adsorbent 28. Then, the degree of permanent deterioration that occurs in the NOx adsorbent 28 can be accurately determined, utilizing the correlation or relationship between the water adsorbing ability and the level of permanent deterioration.

In this embodiment, a determination as to the occurrence of permanent deterioration is made after purge control is completed. Thus, the process of determining deterioration is always started from the time when the NOx adsorbent 28 is brought into substantially the same dried state. Consequently, variations in the result of determination due to differences in the initial conditions can be reduced or eliminated, and the presence or absence of permanent deterioration can be determined with high stability or reliability.

Figure 5:
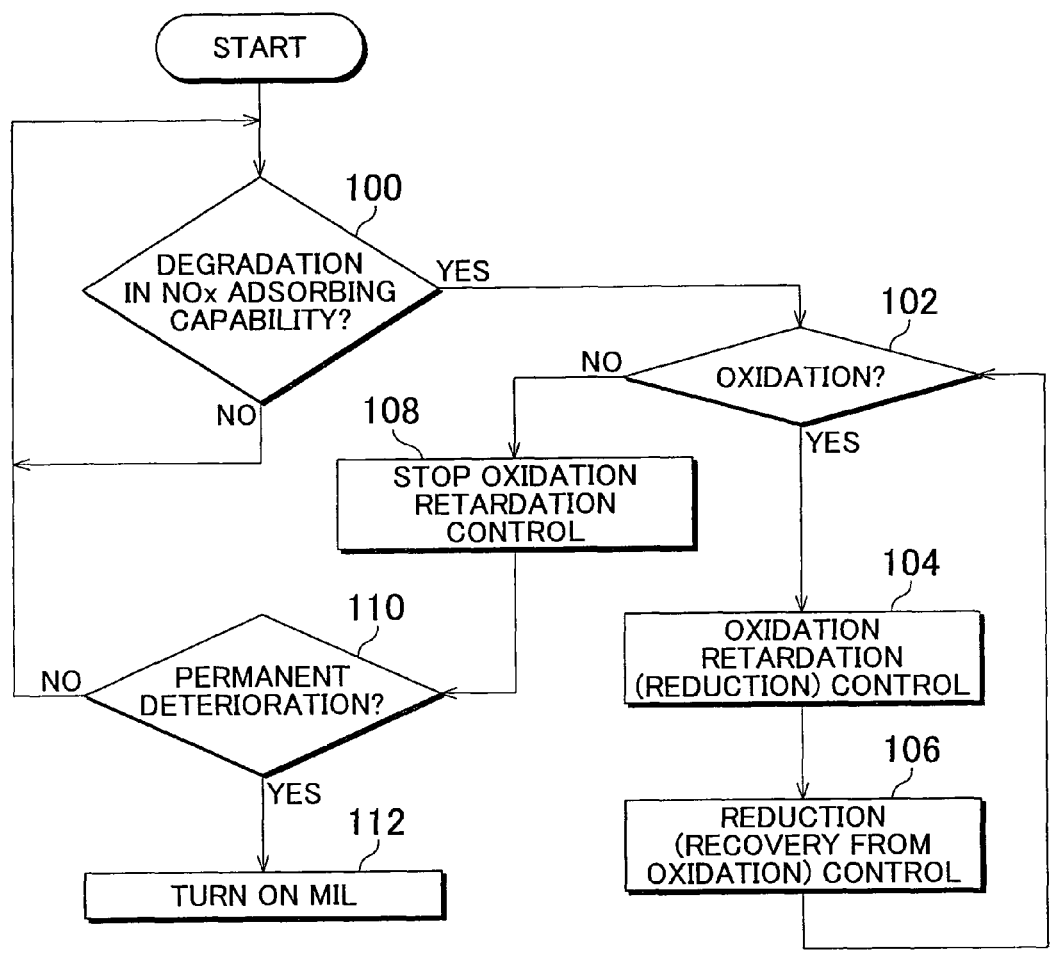
FIG. 5 is a flowchart of a routine executed in the exhaust emission control system according to the first embodiment of the invention.
Figure 6:
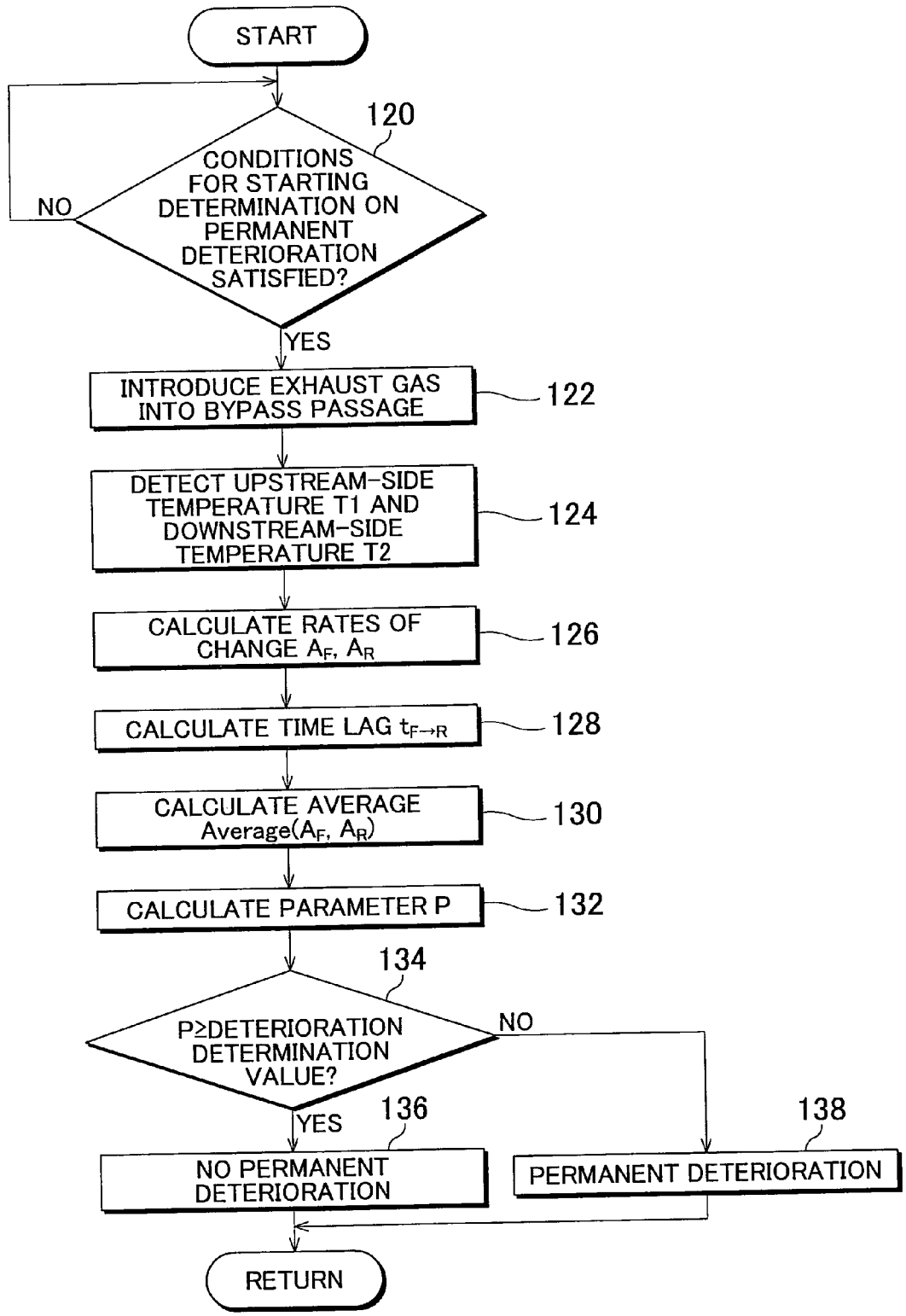
FIG. 6 is a flowchart of a routine executed in the exhaust emission control system according to the first embodiment of the invention.

FIG. 5 and FIG. 6 are flowcharts of routines which the ECU 50 executes so as to implement the system operation of this embodiment. The routines shown in FIG. 5 and FIG. 6 are repeatedly executed at specified time intervals.

In the routine shown in FIG. 5, the ECU 50 initially determines whether the adsorbing capability of the NOx adsorbent 28 has degraded (step 100). In a specific example of this determination, the ECU 50 calculates the flow rate of NOx, based on the intake air quantity detected by the air flow meter 32 and the exhaust air-fuel ratio detected by the A/F sensor 34, while the exhaust gas is being passed through the bypass passage 22.

Also, the ECU 50 calculates the amount of NOx adsorbed by the NOx adsorbent 28, based on the amounts of NOx detected by the NOx sensors 36, 38 at the adsorbent inlet side and outlet side. Then, the ECU 50 determines whether the ratio of the amount of NOx adsorbed by the NOx adsorbent 28 to the amount of NOx flowing into the NOx adsorbent 28 (or the flow rate of NOx) is smaller than a specified value. If an affirmative decision (YES) is obtained in this determination, the adsorbing capability has degraded, and therefore, the ECU 50 determines whether the degradation in the adsorbing capability is caused by oxidation deterioration. If a negative decision (NO) is obtained, normal adsorbing capability is maintained, and therefore, the ECU 50 repeatedly executes step 100 to continue monitoring the adsorbing capability of the NOx adsorbent 28.

Subsequently, it is determined whether oxidation deterioration (i.e., deterioration due to oxidation) occurs in the NOx adsorbent 28 (step 102). If an affirmative decision (YES) is obtained in this step, the ECU 50 performs the oxidation retardation control while utilizing normal combustion control (step 104), and performs the reduction control as needed (step 106). As a result, the NOx adsorbent 28 is substantially recovered from the oxidation deterioration.

If a negative decision (NO) is obtained in step 102 (namely, if it is determined that the degradation in the adsorbing capability is not caused by oxidation deterioration), the oxidation retardation control is stopped (step 108), and it is determined whether the degradation in the adsorbing capability is caused by permanent deterioration (step 110). If an affirmative decision (YES) is obtained in step 110, a warning lamp is turned on (step 112) so as to encourage the user to replace the NOx adsorbent 28 that suffers permanent deterioration, with a new one, for example. If a negative decision (NO) is obtained in step 110, the ECU 50 returns to step 100 to continue monitoring the adsorbing capability.

Referring next to FIG. 6, a process of making a determination as to the occurrence of permanent deterioration, which is carried out in the above step 110, will be more specifically explained.

In the routine of FIG. 6, the ECU 50 initially determines whether conditions for starting determination on permanent deterioration are satisfied (step 120). Specific examples of the starting conditions include, for example, whether purge control is completed. If the starting conditions are not satisfied, the ECU 50 waits until the starting conditions are satisfied. If the starting conditions are satisfied, the ECU 50 controls the switching valve 30 so that exhaust gas is introduced into the bypass passage 22 (step 122).

As a result, the exhaust gas starts flowing into the NOx adsorbent 28, and then the ECU 50 detects the upstream-side temperature T1 and downstream-side temperature T2 of the NOx adsorbent 28 by means of the temperature sensors 40, 42 (step 124). The temperature detection is repeated in a sampling cycle suitable for keeping track of changes in the temperatures T1, T2. In this condition, if water contained in the exhaust gas is adsorbed by the NOx adsorbent 28, the temperatures T1, T2 increase respectively. Then, the ECU 50 calculates the rates $A_F$, $A_R$ of change and the time lag $t_{F \to R}$ (steps 126, 128), based on the detection results of the temperatures T1, T2, as described above.

Next, the ECU 50 calculates the average Average($A_F$, $A_R$) of the rates of change (step 130), and calculates the parameter P using the average and the time lag $t_{F \to R}$ (step 132). Then, the ECU 50 determines whether the parameter P is equal to or larger than the above-mentioned deterioration determination value (step 134). If an affirmative decision (YES) is obtained in step 134, it is determined that the NOx adsorbent 28 is free from permanent deterioration whose level is so high that the NOx adsorbent 28 cannot be used (step 136). If a negative decision (NO) is obtained in step 134, it is determined that permanent deterioration occurs in the NOx adsorbent 28 (step 138).

Referring next to FIG. 7 through FIGS. 10A and 10B, an exhaust emission control system according to a second embodiment of the invention will be described. In this embodiment, substantially the same system configuration and control routine (FIG. 5) as those of the first embodiment are employed. However, this embodiment is different from the first embodiment in that the presence or absence of permanent determination is determined according to the total amount of heat supplied to the NOx adsorbent 28.

Figure 7:
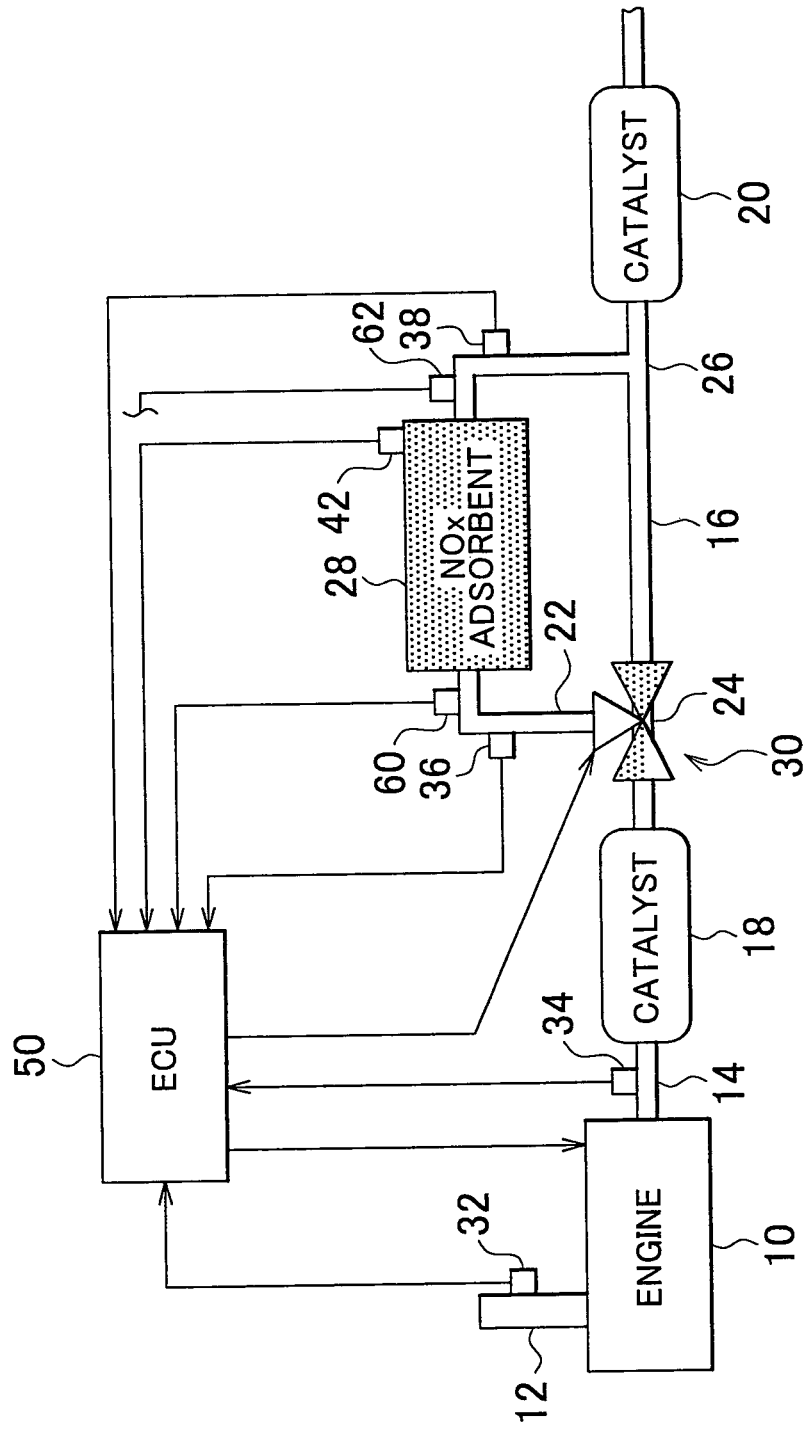
FIG. 7 is a view showing the whole construction of an exhaust emission control system according to a second embodiment of the invention.

FIG. 7 illustrates the whole construction of the exhaust emission control system according to the second embodiment of the invention. In FIG. 7, the same reference numerals as used in FIG. 1 illustrating the first embodiment are used for identifying the same constituent elements, of which explanation will not be provided. As shown in FIG. 7, in this embodiment, two exhaust temperature sensors 60, 62 that serve as first and second gas temperature detecting means are provided in the bypass passage 22.

The upstream-side exhaust temperature sensor 60 is disposed in the bypass passage 22 upstream of the NOx adsorbent 28, and is adapted to detect the temperature of exhaust gas flowing into the NOx adsorbent 28, as an inflow gas temperature Tin. The downstream-side exhaust temperature sensor 62 is disposed in the bypass passage 22 downstream of the NOx adsorbent 28, and is adapted to detect the temperature of exhaust gas flowing out of the NOx adsorbent 28, as an outflow gas temperature Tout.

In this embodiment, when the above-described purge control is started, the process of determining permanent deterioration is carried out in parallel with the purge control. Before the purge control is started, water is adsorbed on the NOx adsorbent 28 in an amount that is close to that of water adsorbed in a saturated condition under the last adsorption control. Once the purge control is started, high-temperature exhaust gas flows into the NOx adsorbent 28, and therefore, the adsorbed water is gradually desorbed from the NOx adsorbent 28.

Since the desorption reaction is an endothermic reaction, a part of heat added to the NOx adsorbent 28 during the desorption reaction is consumed through the desorption reaction, and the temperature of the NOx adsorbent 28 does not increase so much. However, once desorption of water is completed, the temperature of the NOx adsorbent 28 begins to increase largely (or at a high rate). To determine the presence or absence of permanent deterioration, the amount of heat added to the NOx adsorbent 28 between the time at which the exhaust gas begins to flow into the NOx adsorbent 28 and the time at which a large temperature rise appears is calculated as the total amount of heat corresponding to the amount of water adsorbed on the NOx adsorbent 28. Then, the presence or absence of permanent deterioration is determined based on the total amount of heat thus calculated.

Figure 8:
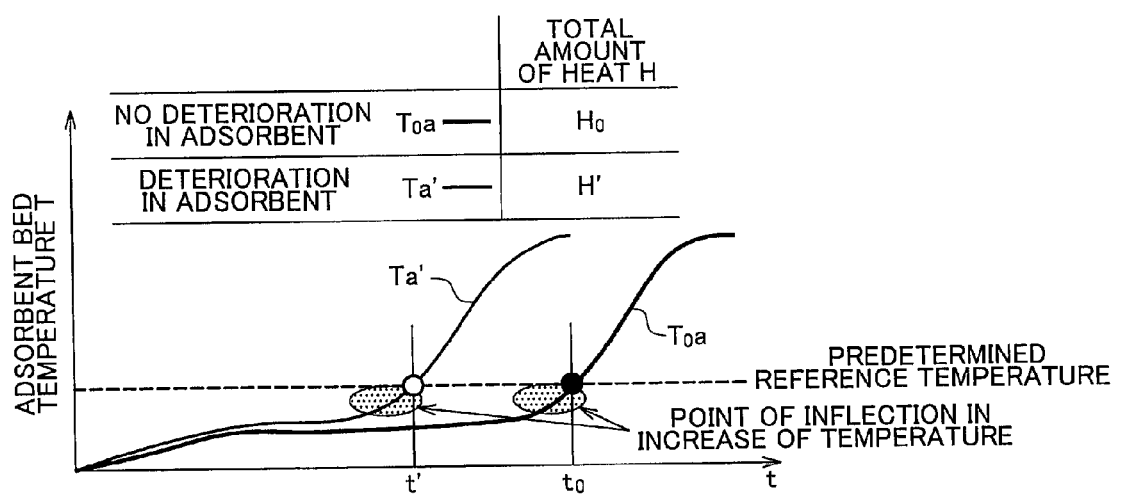
FIG. 8 is a graph showing the relationship between the bed temperature of a NOx adsorbent and the time required for completing desorption of water.

FIG. 8 shows the relationship between the temperature (i.e., bed temperature) T of the NOx adsorbent 28 and the water-desorption completion time t. The water-desorption completion time is defined as the time elapsed from a point in time at which the exhaust gas begins to flow into the NOx adsorbent 28 to a point in time at which desorption of water whose amount is close to that of water adsorbed in a saturated condition is completed. In FIG. 8, $T_0$a represents the temperature of the normal NOx adsorbent 28 that is free from permanent deterioration, and $t_0$ represents the desorption completion time of the normal NOx adsorbent 28. Also, Ta' and t' represent the temperature of the permanently deteriorated NOx adsorbent 28 and the desorption completion time thereof, respectively. Furthermore, the total amount of heat H is defined as an integrated value of the amount of heat added to the NOx adsorbent 28 during the desorption completion time t. $H_0$ and H' represent the total amounts of heat added to the normal NOx adsorbent 28 and the permanently deteriorated NOx adsorbent 28 respectively.

As is understood from the characteristic curves in FIG. 8, once desorption of the adsorbed water is completed, the temperature T of the NOx adsorbent 28 increases largely and reaches a predetermined reference temperature Ts, at which a point of inflection arises in the rate of increase of the temperature T per unit time. The reference temperature Ts is set as a temperature level which the temperature of the NOx adsorbent 28 reaches when it increases largely (or when a point of inflection arises in the rate of increase of temperature). The reference temperature Ts is stored in advance in the ECU 50.

In the process of determining permanent deterioration therefore, the temperature T of the NOx adsorbent 28 is detected once purge control is started. Since it is preferable to detect the temperature T at a position where the detected temperature reflects the temperature of the whole NOx adsorbent 28, the temperature detection is conducted in this embodiment using the downstream-side temperature sensor 42 disposed in the rear portion of the NOx adsorbent 28. When at least one of two conditions (1), (2), i.e., (1) a point of inflection arises in the rate of increase of the temperature T, and (2) the temperature T becomes equal to or higher than the predetermined reference temperature Ts, it is determined that a particular temperature condition is established which indicates that desorption of the adsorbed water is completed.

Subsequently, the time elapsed from the time when the exhaust gas begins to flow into the NOx adsorbent 28 to the time when the above-described determination is made is measured as the desorption completion time (i.e., a period of time required for completion of desorption) t. Then, the total amount H of heat added to the NOx adsorbent 28 during the desorption completion time t is calculated, using the intake air quantity Ga (corresponding to the flow rate of exhaust gas) detected by the air flow meter 32, the above-mentioned inflow gas temperature Tin and outflow gas temperature Tout, and the desorption completion time t. More specifically, the total amount of heat H is obtained by performing integration according to the following equation (2) over an integration period or range equal to the desorption completion time t, using the history Ga(i) of the intake air quantity and the histories Tin(i), Tout(i) of the temperatures as time-series data for use in integration.

$$H = \int_0^t Ga(i) \cdot \{Tin(i) - Tout(i)\} dt \wedge \tag{2}$$

The total amount of heat H thus calculated is equivalent to the amount of heat required for desorbing water from the NOx adsorbent 28 in an amount close to that of water adsorbed on the NOx adsorbent 28 in a saturated condition. In this connection, the saturation amount of adsorbed water (i.e., the amount of water with which the NOx adsorbent 28 is saturated) is in correlation with the number of the NOx adsorption sites in the NOx adsorbent 28, namely, the level of permanent deterioration, as described above. As the deterioration level becomes higher, the saturation amount of adsorbed water decreases, and the total amount of heat H also decreases accordingly.

Figure 9:
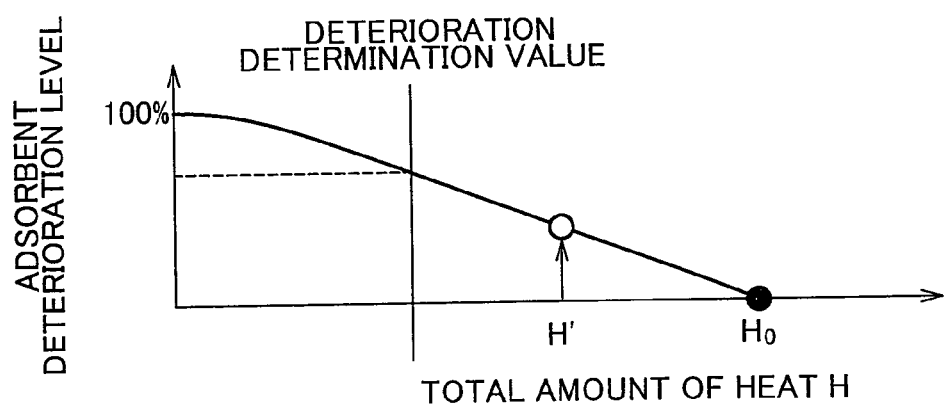
FIG. 9 is a graph showing the relationship between the total amount of heat added to the NOx adsorbent and the level of permanent deterioration.

FIG. 9 shows a characteristic curve indicating the relationship between the total amount of heat added to the NOx adsorbent 28 and the level of permanent deterioration. As is understood from FIG. 9, the total amount H' of heat added to the permanently deteriorated NOx adsorbent 28 is reduced to be smaller than the total amount $H_0$ of heat added to the normal NOx adsorbent 28, and the amount of reduction in the total amount of heat increases as the deterioration progresses (namely, as the deterioration level increases). Thus, it is determined that the NOx adsorbent 28 suffers permanent deterioration whose level is so high that the NOx adsorbent 28 cannot be used, when the total amount H of heat is reduced to be smaller than a predetermined deterioration determination value. In this case, the deterioration determination value, which is a value of the total amount of heat corresponding to the permissible limit of the deterioration level, is stored in advance in the ECU 50.

With the arrangement as described above, the presence or absence of permanent deterioration can be accurately determined based on the total amount H of heat required for desorbing water from the NOx adsorbent 28.

In the embodiment as described above, at least one of the condition (1) that a point of inflection is detected in the rate of increase of the temperature, and the condition (2) that the temperature T becomes equal to or higher than the reference temperature Ts is used for determining completion of desorption of adsorbed water, so that the timing of completion of water desorption can be accurately or precisely determined. In this case, the determination based on the condition (1) makes it possible to stably detect a change in the rate of increase of the temperature T even in the presence of disturbances, such as a change in the ambient temperature. Also, the determination as to completion of desorption of water can be easily made based on the condition (2), which only requires an operation to compare the temperature T with the reference temperature Ts. By using both of the two conditions (1), (2), the determination accuracy can be further enhanced.

Furthermore, in this embodiment, the process of determining permanent deterioration is carried out when purge control is started. Thus, the deterioration determining process can be always started from the time when the NOx adsorbent 28 is in substantially the same water adsorbing condition. Consequently, variations in the results of determination due to differences in the initial conditions can be reduced or eliminated, and the presence or absence of permanent deterioration can be determined with stability.

Figure 10A:
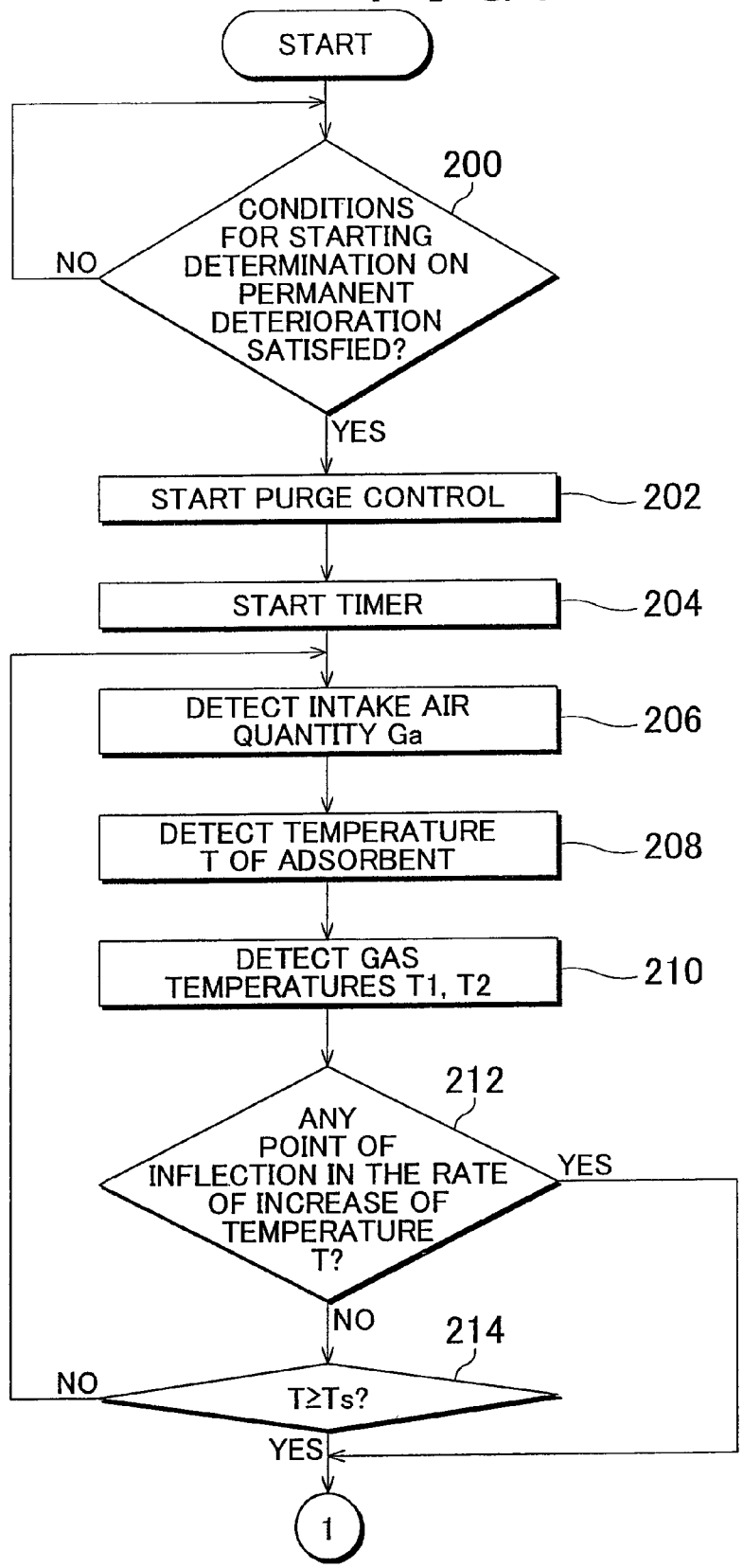
FIGS. 10A and 10B are a flowchart of a routine executed in an exhaust emission control system according to the second embodiment of the invention.
Figure 10B:
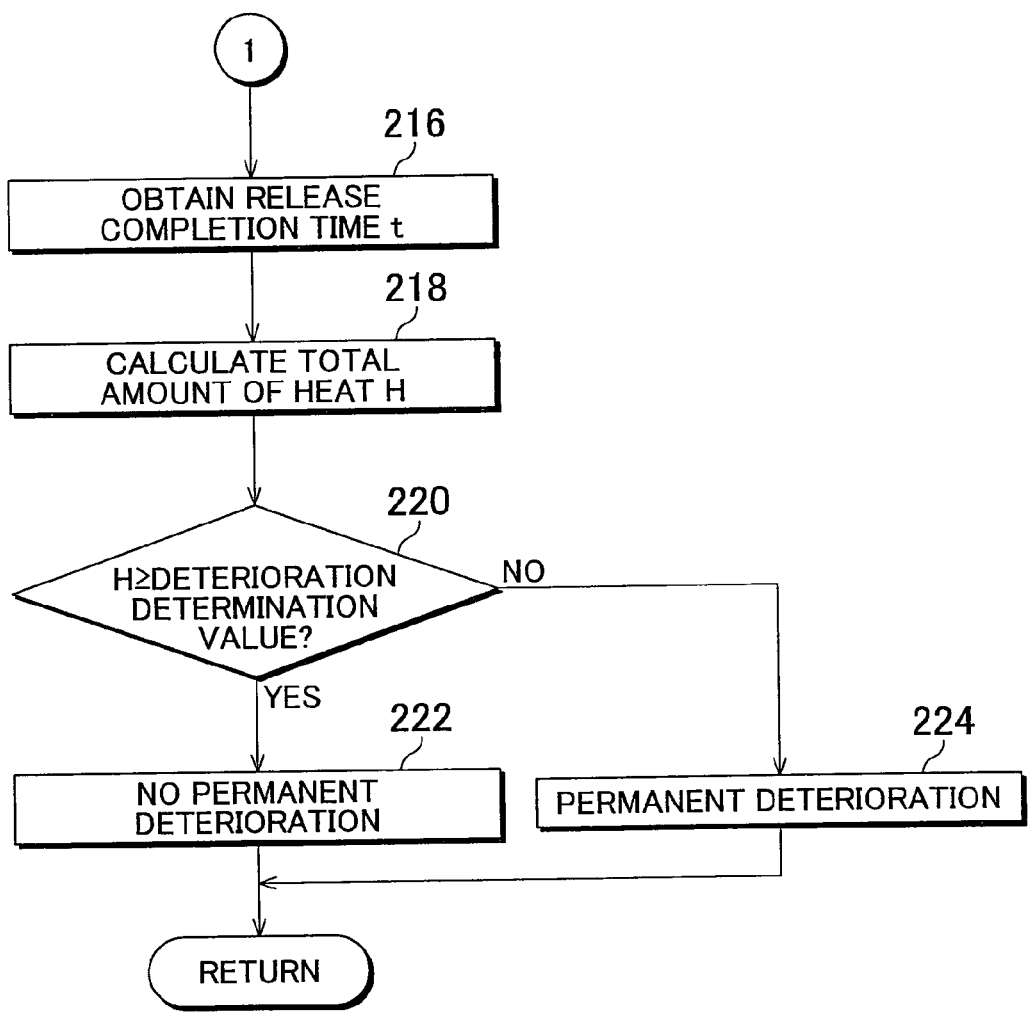

FIGS. 10A and 10B are a flowchart of a routine which the ECU 50 executes so as to implement the system operation of this embodiment. The routine of FIGS. 10A and 10B is executed in place of the routine of FIG. 6, when a routine similar to that of FIG. 5 is carried out in this embodiment.

In the routine shown in FIG. 10A, the ECU 50 initially determines whether conditions for starting the process of determining the occurrence of permanent deterioration are satisfied (step 200). Specific examples of the starting conditions include, for example, whether purge control is ready to start. If the starting conditions are not satisfied, the ECU 50 waits until the starting conditions are satisfied. If the starting conditions are satisfied, the ECU 50 starts purge control (step 202), and starts a timer for measuring the desorption completion time t (step 204).

With the purge control thus started, the exhaust gas begins to flow into the NOx adsorbent 28, and the ECU 50 detects the intake air quantity Ga, the temperature T of the NOx adsorbent 28, and the inflow gas temperature Tin and outflow gas temperature Tout (steps 206-210). The detection of these parameters is repeated in a sampling cycle suitable for keeping track of changes in the temperature T, and accumulating the histories Ga(i), Tin(i) and Tout(i) as time-series data for use in integration.

The ECU 50 determines whether the above-described condition (1) or (2) is satisfied (steps 212, 214), based on the temperature T of the NOx adsorbent 28, while performing the above-described detecting operations. If one of the conditions (1), (2) is satisfied, the ECU 50 determines that desorption of adsorbed water is completed, and obtains the desorption completion time t from the value of the timer (step 216). If neither of the conditions (1), (2) is satisfied, the ECU 50 determines that desorption of water has not been completed, and continues the detecting operations of steps 206-210.

Subsequently, the ECU 50 calculates the total amount of heat H by integration according to the above-indicated equation (2), using the history Ga(i) of the intake air quantity, the histories Tin(i), Tout(i) of the temperatures, and the desorption completion time t (step 218). The ECU 50 then determines whether the total amount of heat H is equal to or larger than the above-mentioned deterioration determination value (step 220). If an affirmative decision (YES) is obtained in step 220, the ECU 50 determines that the NOx adsorbent 28 does not suffer permanent deterioration whose level is so high that the NOx adsorbent 28 cannot be used (step 222). If a negative decision (NO) is obtained in step 220, the ECU 50 determines that permanent deterioration occurs in the NOx adsorbent 28 (step 224).

In the second embodiment, the invention is applied to, for example, a system (which will be called "exhaust purge type system") in which NOx (purge gas) desorbed from the NOx adsorbent 28 joins or flows into the exhaust system. However, the invention is not limited to this arrangement, but may also be applied to, for example, a system (which will be called "EGR purge type system") in which purge gas is recirculated into the intake system. The EGR purge type system is provided with a flow meter for detecting the flow rate $V_{EGR}$ of purge gas recirculated into the intake system. In this system, the total amount of heat $H_{EGR}$ for use in determination on permanent deterioration may be calculated according to the following equation (3), using the history $V_{EGR}(i)$ of the flow rate of purge gas.

$$H_{EGR} = \int_0^t V_{EGR}(i) \cdot \{Tin(i) - Tout(i)\} dt \Lambda \qquad (3)$$

In a composite purge type system in which the exhaust purge type system and the EGR purge type system are combined together, the total amount of heat $H_{ALL}$ concerning the whole system (i.e., the composite purge system) may be calculated according to the following equation (4), using the total amount of heat H calculated with respect to the purge gas fed to the exhaust system, and the total amount of heat $H_{EGR}$ calculated with respect to the purge gas fed through the EGR system.

$$H_{ALL} = H + H_{EGR} \qquad (4)$$

In the second embodiment, the intake air quantity Ga detected by the air flow meter 32 is used as a parameter representing the flow rate of the exhaust gas. However, the invention is not limited to this arrangement, but the flow rate of the exhaust gas may be calculated based on, for example, the intake air quantity Ga and the exhaust air-fuel ratio detected by the A/F sensor 34. In this manner, the flow rate of the exhaust gas, which varies with not only the intake air quantity but also the air-fuel ratio (rich or lean), can be accurately calculated, thus assuring further improved accuracy in calculation of the total amount of heat.

Figure 11:
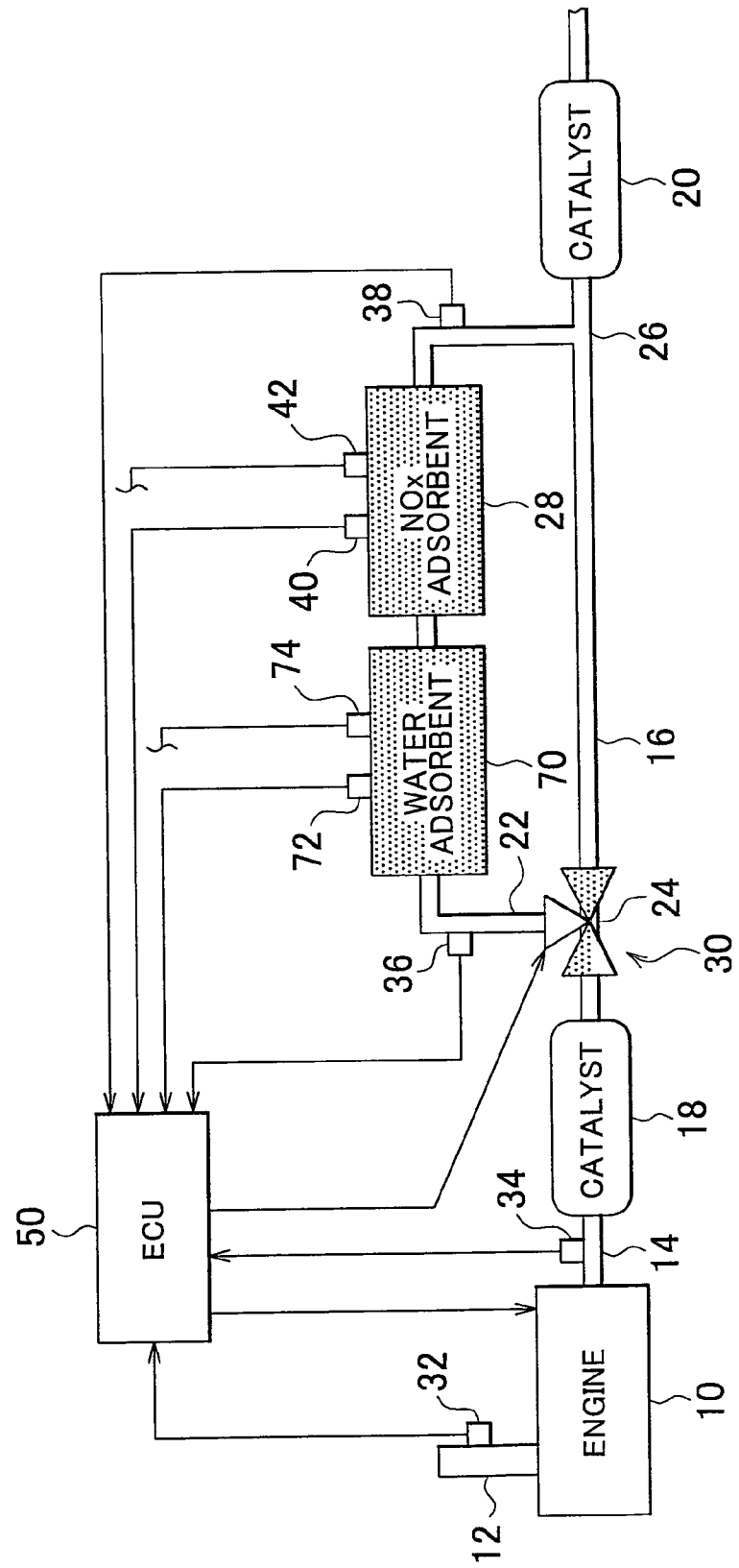
FIG. 11 is a view showing the whole construction of an exhaust emission control system according to a third embodiment of the invention.
Figure 12:
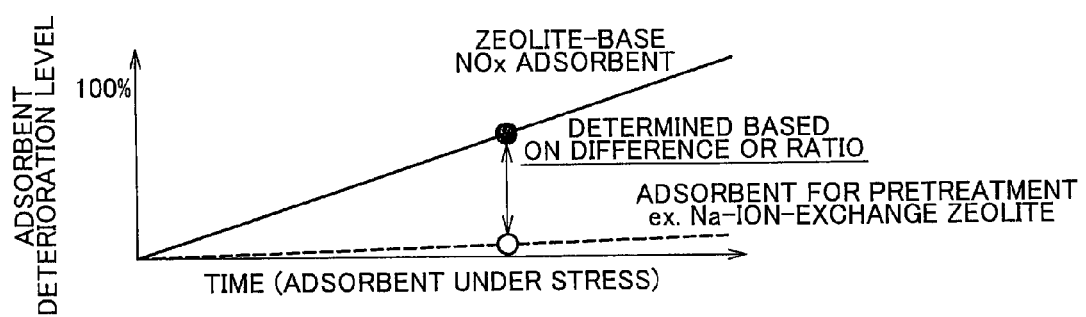
FIG. 12 is an explanatory view showing the progress of permanent deterioration with time, with respect to a NOx adsorbent and a water adsorbent (adsorbent for pretreatment)
Figure 13:
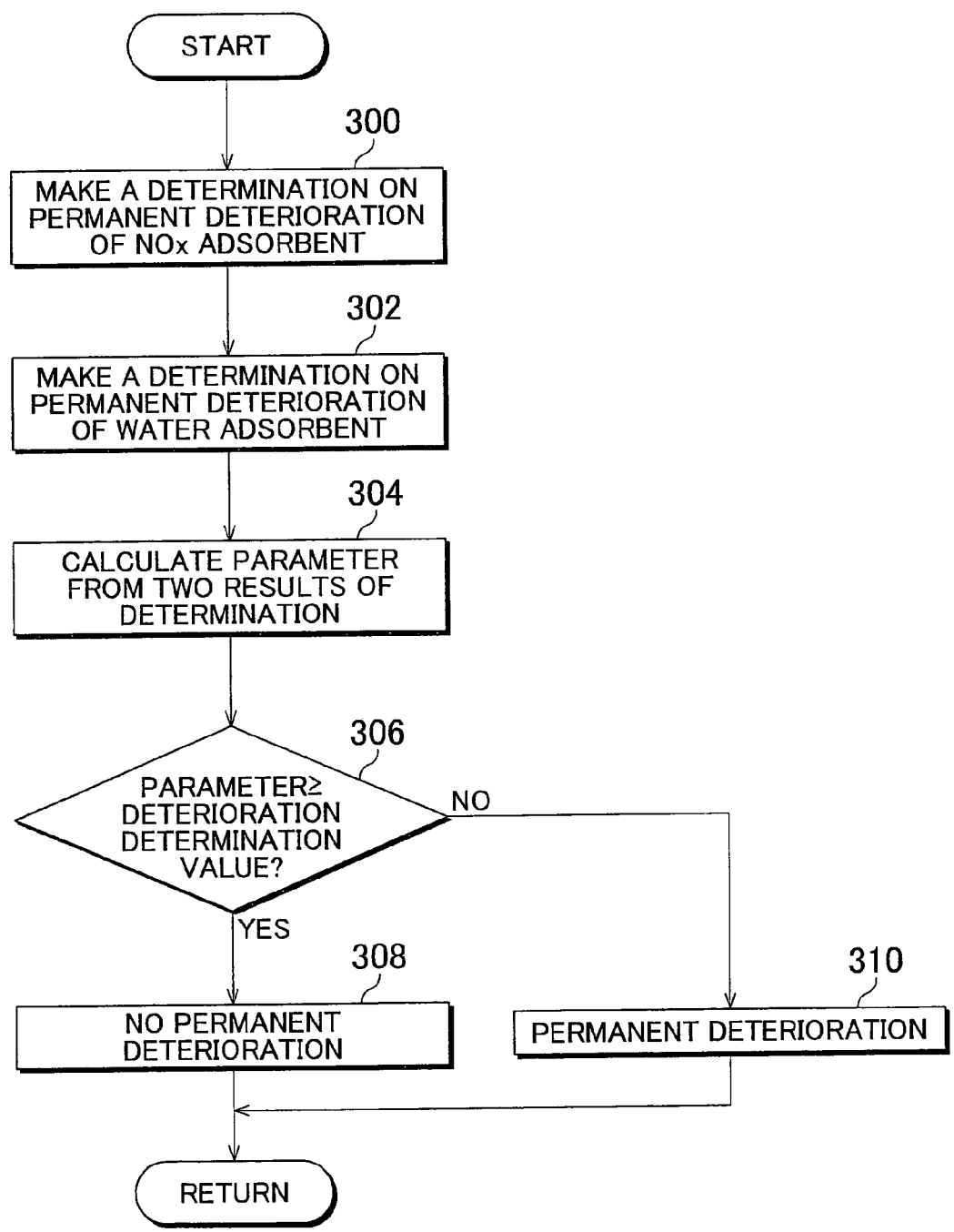
FIG. 13 is a flowchart of a routine executed in the third embodiment of the invention.

Referring next to FIG. 11 through FIG. 13, a third embodiment of the invention will be described. In this embodiment, substantially the same system configuration and control routine as those of the first embodiment are employed. However, the third embodiment is different from the first embodiment in that the NOx adsorbent is used along with an auxiliary adsorbent, and that a result of determination on deterioration of the NOx adsorbent is corrected base on a result of determination on deterioration of the auxiliary adsorbent.

FIG. 11 illustrates the construction of an exhaust emission control system according to the third embodiment of the invention. In FIG. 11, the same reference numerals as used in FIG. 1 illustrating the first embodiment are used for identifying the same constituent elements, of which explanation will not be provided. As shown in FIG. 11, the system of this embodiment includes a water adsorbent 70 as an auxiliary adsorbent, and temperature sensors 72, 74.

Like the NOx adsorbent 28, the water adsorbent 70 is formed of, for example, zeolite containing alumina. However, the zeolite has been ion exchanged with a metal, such as sodium, in place of iron. Therefore, the water adsorbent 70 does not have a NOx adsorbing capability, but is able to adsorb water contained in the exhaust gas. The water adsorbent 70 is provided in the bypass passage 22 at a position upstream of the NOx adsorbent 28.

The temperature sensors 72, 74 are adapted to detect the temperature (bed temperature) of a front portion of the water adsorbent 70 and the temperature of a rear portion of the water adsorbent 70, respectively. With this arrangement, the ECU 50 is able to determine the occurrence of permanent deterioration in the water adsorbent 70, in the same manner as that in which the occurrence of permanent deterioration in the NOx adsorbent 28 is determined in the first embodiment. In the third embodiment, the result of determination on permanent deterioration of the NOx adsorbent 28 is corrected based on the result of determination on permanent deterioration of the water adsorbent 70.

FIG. 12 is an explanatory view showing the progress of permanent deterioration over time, with respect to the NOx adsorbent 28 and the water adsorbent 70 (adsorbent for pretreatment), respectively. Since the water adsorbent 70 carries sodium in place of iron, alumina is stably held in zeolite. Therefore, the water adsorbent 70 has a characteristic that it is less likely to permanently deteriorate than the NOx adsorbent 28, as shown in FIG. 12.

In this embodiment, therefore, a difference between the permanent deterioration level of the NOx adsorbent 28 and the permanent deterioration level of the water adsorbent 70, or the ratio of the permanent deterioration levels of these adsorbents 28, 70, is calculated. Then, a final determination on the occurrence of permanent deterioration in the NOx adsorbent 28 is made by using the calculated value. In this manner, the result of determination on permanent deterioration of the NOx adsorbent 28 can be corrected based on the result of determination on permanent deterioration of the water adsorbent 70.

Namely, even in the presence of errors in the result of determination due to, for example, disturbances, or inherent errors arising from an environment in which the NOx adsorbent 28 is installed, these errors can be cancelled out between the result of determination on the NOx adsorbent and the result of determination on the water adsorbent 70. It is thus possible to enhance the accuracy in determination of permanent deterioration, and improve the reliability of the determination.

FIG. 13 is a flowchart of a routine which the ECU 50 executes so as to implement the system operation of this embodiment. The routine of FIG. 13 is executed in step 110 of FIG. 5 while a routine similar to that of FIG. 5 is carried out in this embodiment.

In the routine as shown in FIG. 13, the ECU 50 determines whether permanent deterioration occurs in the NOx adsorbent 28 (step 300), by using, for example, a determination method similar to that of the first embodiment. The result of determination obtained in step 300 is a provisional one (prior to being corrected). Then, the ECU 50 determines whether permanent deterioration occurs in the water adsorbent 70 (step 302), by using the same method as that of step 300.

Next, the ECU 50 calculates a difference between the permanent deterioration level of the NOx adsorbent 28 and the permanent deterioration level of the water adsorbent 70, or the ratio of the permanent deterioration levels of these adsorbents 28, 70, as a final determination parameter (step 304). Then, as in the first embodiment, the ECU 50 determines whether the parameter obtained in step 304 is equal to or larger than a predetermined deterioration determination value (step 306), and determines the presence or absence of permanent deterioration according to the result of determination (step 308, step 310). It is thus possible to accurately determine the occurrence of permanent deterioration while excluding influences of disturbances or environmental errors.

In the first embodiment as described above, steps 102, 110 of FIG. 5 represent a specific example of adsorbing capability determining means. Of these steps, step 102 represents a specific example of oxidation determining means, and step 110 represents a specific example of permanent determination determining means. Also, step 104 represents a specific example of normal-time reducing means, and step 106 represents a specific example of adsorbent regenerating means, while step 112 represents a specific example of informing means. Furthermore, step 126 of FIG. 6 represents a specific example of temperature increase rate acquiring means, and step 128 represents a specific example of time lag acquiring means.

In the second embodiment, step 206 of FIGS. 10A and 10B represents a specific example of exhaust gas flow rate acquiring means, steps 212, 214 represent a specific example of temperature condition determining means, step 216 represents a specific example of time measuring means, step 218 represents a specific example of total heat amount calculating means, and steps 220-224 represent a specific example of adsorbing capability determining means. In the third embodiment, step 302 of FIG. 13 represents a specific example of auxiliary deterioration determining means, and step 304 represents a specific example of adsorbing capability determining means.

In the third embodiment, the auxiliary adsorbent takes the form of the water adsorbent 70 by way of example. However, the auxiliary adsorbent of the invention is not limited to the water adsorbent adapted to adsorb water, but may be selected from other adsorbents adapted to adsorb exhaust gas components other than NOx. For example, a CO adsorbent, an HC adsorbent, or the like, may be used as the auxiliary adsorbent.

Also in the third embodiment, the presence or absence of permanent deterioration is determined by the same or similar method as that of the first embodiment. However, the invention is not limited to this arrangement, but permanent deterioration of the adsorbents 28, 70 may be determined in the third embodiment, by the same or similar method as that of the second embodiment.

Furthermore, in each of the illustrated embodiments, a zeolite-base adsorbent is used as the NOx adsorbent. However, the invention is not limited to the use of this type of adsorbent, but may be widely applied to systems using NOx adsorbents other than the zeolite-base adsorbent.

The invention claimed is:

1. An exhaust emission control system of an internal combustion engine, comprising:
   a bypass passage provided in an exhaust passage of the internal combustion engine and arranged to bypass a main passage that is a part of the exhaust passage;
   a NOx adsorbent provided in the bypass passage and adapted to adsorb at least NOx from among components contained in exhaust gas;
   a channel switching device that switches a channel of the exhaust gas between the main passage and the bypass passage;
   a first temperature sensor that detects a temperature of a portion of the NOx absorbent which is located on an upstream side as viewed in a direction in which the exhaust gas flows, as an upstream-side temperature;
   a second temperature sensor that detects a temperature of a portion of the NOx adsorbent which is located on a downstream side as viewed in the direction in which the exhaust gas flows, as a downstream-side temperature; and
   an electronic control unit programmed to;
       control the channel switching device, based on operating conditions of the internal combustion engine, so as to cause the exhaust gas to flow through the bypass passage, determine, when the adsorbing capability of the NOx adsorbent degrades, whether the degradation in the adsorbing capability is a surmountable degradation from which the NOx adsorbent can recover, or an insurmountable degradation from which the NOx adsorbent cannot recover, determine whether the degradation in the adsorbing capability is caused by oxidation of the NOx adsorbent, determine, when the degradation in the adsorbing capability is not caused by oxidation, whether the degradation in the adsorbing capability is caused by irreversible structural changes in the NOx adsorbent, compare changes in the upstream-side temperature with changes in the downstream-side temperature when the exhaust gas flows into the NOx adsorbent to cause the changes in the upstream-side temperature and the downstream-side temperature, and determine whether the degradation in the adsorbing capability is in insurmountable degradation from which the NOx adsorbent cannot recover, based on a result of the comparison.

2. The exhaust emission control system according to claim 1, wherein the electronic control unit is further programmed to:

obtain a rate of increase of temperature per unit time, with regard to at least one of the upstream-side temperature and the downstream-side temperature which increase as the exhaust gas flows through the NOx adsorbent, obtain a time lag between a rise in the upstream-side temperature and a rise in the downstream-side temperature, and determine whether the degradation in the adsorbing capability is an insurmountable degradation from which the NOx cannot recover, based on a product of the rate of increase of temperature and the time lag.

3. The exhaust emission control system according to claim 1, wherein the electronic control unit is further programmed to obtain a rate of increase of temperature per unit time, with regard to the upstream-side temperature and the downstream-side temperature which increase as the exhaust gas flows through the NOx adsorbent, obtain a time lag between a rise in the upstream-side temperature and a rise in the downstream-side temperature, and determine whether the degradation in the adsorbing capability is an insurmountable degradation from which the NOx adsorbent cannot recover, based on a product of an average of the rate of increase of the upstream-side temperature and the rate of increase of the downstream-side temperature and the time lag.

4. The exhaust emission control system according to claim 1, wherein the electronic control unit is further programmed to determine whether the degradation in the adsorbing capability is an insurmountable degradation from which the NOx adsorbent cannot recover, after purge control for purging NOx adsorbed on the NOx adsorbent is completed.

5. The exhaust emission control system according to claim 1, wherein the electronic control unit is further programmed to:

determine whether a particular temperature condition appears in the NOx adsorbent, after the exhaust gas begins to flow into the NOx adsorbent, calculate a total amount of heat added to the NOx adsorbent during a period from a point in time at which the exhaust gas begins to flow into the NOx adsorbent to a point in time at which the particular temperature condition appears in the NOx adsorbent, and determine whether the degradation in the adsorbing capability is an insurmountable degradation from which the NOx adsorbent cannot recover, based on the total amount of heat.

6. The exhaust emission control system according to claim 5, wherein the electronic control unit is further programmed to determine that the particular temperature condition appears in the NOx adsorbent when the NOx adsorbent reaches a predetermined reference temperature.

7. The exhaust emission control system according to claim 5, wherein the electronic control unit is further programmed to determine that the particular temperature condition appears in the NOx adsorbent When a point of inflection arises in the rate of increase of the temperature of the NOx adsorbent per unit time.

8. The exhaust emission control system according to claim 5, wherein the electronic control unit is further programmed to determine that the particular temperature condition appears in the NOx adsorbent when the NOx adsorbent reaches a predetermined reference temperature, and a point of inflection arises in the rate of increase of the temperature of the NOx adsorbent per unit time.

9. The exhaust emission control system according to claim 5, further comprising:

a first gas temperature sensor that detects a temperature of exhaust gas flowing into the NOx adsorbent, as an inflow gas temperature; and a second gas temperature sensor that detects a temperature of exhaust gas flowing out of the NOx adsorbent, as an outflow gas temperature, wherein the electronic control unit is further programmed to:

obtain a flow rate of exhaust gas emitted from the internal combustion engine, measure an elapsed time from the point in time at which the exhaust gas begins to flow into the NOx adsorbent to the point in time at which the particular temperature condition appears in the NOx adsorbent, and calculate the total amount of heat, based on the obtained flow rate of the exhaust gas, the detected inflow gas temperature, the detected outflow gas temperature, and the measured elapsed time.

10. The exhaust emission control system according to claim 5, Wherein the electronic control unit is further programmed to determine whether the degradation in the adsorbing capability is an insurmountable degradation from which the NOx adsorbent cannot recover, when purge control for purging NOx adsorbed on the NOx adsorbent is started.

11. The exhaust emission control system according to claim 1, further comprising:

an auxiliary adsorbent provided, along with the NOx adsorbent, in the bypass passage and adapted to adsorb an exhaust gas component other than NOx, wherein the electronic control unit is further programmed to:

determine whether the auxiliary adsorbent suffers an insurmountable degradation in the adsorbing capability, from which the auxiliary adsorbent cannot recover, and correct a result of determination on deterioration of the NOx adsorbent, based on a result of determination on deterioration of the auxiliary adsorbent.

12. The exhaust emission control system according to claim 1, further comprising:

an exhaust air-fuel ratio sensor that obtains an air-fuel ratio of exhaust gas emitted from the internal combustion engine, wherein the electronic control unit is further programmed to control the channel switching device so as to cause the exhaust gas to flow through the bypass passage, when a temperature of the NOx adsorbent is within a temperature range suitable for a reduction process, and the detected air-fuel ratio of the exhaust gas becomes rich.

13. The exhaust emission control system according to claim 1, wherein the electronic control unit is further programmed to:
   perform a reduction process on the NOx adsorbent when a surmountable degradation in the adsorbing capability, from which the NOx adsorbent can recover, occurs in the NOx adsorbent, and
   give a notice that an insurmountable degradation in the adsorbing capability, from which the NOx adsorbent cannot recover, occurs in the NOx adsorbent, when the insurmountable degradation in the adsorbing capability occurs in the NOx adsorbent.

14. The exhaust emission control system according to claim 5, further comprising:
   an EGR passage through which a part of exhaust gas discharged from the NOx adsorbent is recirculated into an intake system of the internal combustion engine;
   a first gas temperature sensor that detects a temperature of exhaust gas flowing into the NOx adsorbent, as an inflow gas temperature; and
   a second gas temperature sensor that detects a temperature of exhaust gas flowing out of the NOx adsorbent, as an outflow gas temperature, wherein
   the electronic control unit is further programmed to:
      obtain a flow rate of the exhaust gas recirculated into the intake system,
      obtain a flow rate of exhaust gas emitted from the internal combustion engine,
      measure an elapsed time from the point in time at which the exhaust gas begins to flow into the NOx adsorbent to the point in time at which the particular temperature condition appears in the NOx adsorbent, and
      calculate the total amount of heat, based on the flow rate of the exhaust gas recirculated to the intake system, the flow rate of the exhaust gas emitted from the internal combustion engine, the detected inflow gas temperature, the detected outflow gas temperature, and the measured elapsed time.

15. The exhaust emission control system according to claim 11, wherein the auxiliary adsorbent adsorbs at least one exhaust gas component selected from the group consisting of water, CO and HC contained in the exhaust gas.

* * * * *